(12) United States Patent
Stuart et al.

(10) Patent No.: US 6,704,318 B1
(45) Date of Patent: *Mar. 9, 2004

(54) SWITCHED TOKEN RING OVER ISL (TR-ISL) NETWORK

(75) Inventors: Carson Stuart, Chapel Hill, NC (US); David A. Carroll, Apex, NC (US); Jeffrey W. Kidd, Hillsborough, NC (US); Kara J. Adams, Raleigh, NC (US); Kenneth H. Potter, Jr., Raleigh, NC (US); Wayne Garavaglia, Woodside, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,668

(22) Filed: Mar. 10, 1999

Related U.S. Application Data

(60) Provisional application No. 60/110,332, filed on Nov. 30, 1998.

(51) Int. Cl.[7] .......................... H04L 12/28; H04L 12/56
(52) U.S. Cl. .................................................. 370/403
(58) Field of Search ................................ 370/401, 402, 370/434, 403, 404, 411, 405, 452, 406, 407, 408, 258, 400, 395.53, 450, 393; 714/758

(56) References Cited

U.S. PATENT DOCUMENTS

| | | | |
|---|---|---|---|
| 4,823,338 A | 4/1989 | Chan et al. | 370/85 |
| 4,864,559 A | 9/1989 | Perlman | 370/60 |

(List continued on next page.)

OTHER PUBLICATIONS

Overview of Token Ring Switching, Web, http://www.cisco.com/univercd/cc/td/doc/product/lan/trsrb/overview.htm, Oct. 8, 1998, pp. 1–8.
Radia Perlman, *Interconnections: Bridges and Routes*, 1992, pp. 99–125.
Andrew S. Tanenbaum, *Computer Networks, Third Edition*, 1996, pp. 275–318.
Annex K—DTR Concentrator Functional Description, Jul. 31, 1995, pp. K–1–K–22.
Configuring VTP and Virtual LANs, Cisco Systems, Inc., Feb. 27, 1998, pp. 13–1–13–24.
A New Protocol For Route Discovery In Multiple–Ring Networks: Part I—The Basic Protocol, Reuven Cohen, Jun. 25, 1997, pp. 488–498.

(List continued on next page.)

*Primary Examiner*—Chi Pham
*Assistant Examiner*—Alexander O. Boakye
(74) *Attorney, Agent, or Firm*—Cesari and McKenna, LLP

(57) ABSTRACT

A technique efficiently transports token ring (TR) frames over trunks interconnecting switches of a distributed TR bridge. The TR bridge is characterized by a logical switch fabric that is distributed among the interconnected switches by the trunks, which are preferably interswitch link (ISL) trunks. Each switch includes a Bridge Relay Function (BRF) coupled to a plurality of Concentrator Relay Functions (CRFs) having a plurality of ports for receiving TR frames over TR segments. The BRF and CRF of the distributed TR bridge operate according to a 2-tier switching model wherein each CRF and BRF is assigned an individual virtual local area network identifier. The technique encapsulates the TR frames in a TR-ISL protocol format that accomodates differences in formats of various TR frames and that comports with the 2-tier switching model of the distributed TR bridge.

48 Claims, 14 Drawing Sheets

U.S. PATENT DOCUMENTS

| | | | |
|---|---|---|---|
| 5,018,133 A | 5/1991 | Tsukakoshi et al. | 370/16 |
| 5,027,350 A | 6/1991 | Marshall | 370/85.13 |
| 5,088,032 A | 2/1992 | Bosack | 395/200 |
| 5,088,090 A | 2/1992 | Yacoby | 370/85.13 |
| 5,095,480 A | 3/1992 | Fenner | 370/94.1 |
| 5,111,453 A | 5/1992 | Morrow | 370/85.13 |
| 5,144,622 A | 9/1992 | Takiyasu et al. | 370/85.13 |
| 5,280,480 A | 1/1994 | Pitt et al. | 370/85.13 |
| 5,309,437 A | 5/1994 | Perlman et al. | 370/85.13 |
| 5,323,394 A | 6/1994 | Perlman | 370/85.13 |
| 5,331,637 A | 7/1994 | Francis et al. | 370/54 |
| 5,349,583 A * | 9/1994 | Christensen et al. | 370/276 |
| 5,353,283 A | 10/1994 | Tsuchiya | 370/60 |
| 5,394,402 A | 2/1995 | Ross | 370/94.1 |
| 5,414,704 A | 5/1995 | Spinney | 370/60 |
| 5,442,633 A | 8/1995 | Perkins et al. | 370/94.1 |
| 5,448,565 A | 9/1995 | Chang et al. | 370/85.13 |
| 5,491,687 A | 2/1996 | Christensen et al. | 370/17 |
| 5,500,860 A | 3/1996 | Perlman et al. | 370/85.13 |
| 5,511,168 A | 4/1996 | Perlman et al. | 395/200.15 |
| 5,517,620 A | 5/1996 | Hashimoto et al. | 395/200.15 |
| 5,583,996 A | 12/1996 | Tsuchiya | 395/200.15 |
| 5,583,997 A * | 12/1996 | Hart | 709/218 |
| 5,600,644 A | 2/1997 | Chang et al. | 370/404 |
| 5,617,421 A | 4/1997 | Chin et al. | 370/402 |
| 5,623,532 A | 4/1997 | Houde et al. | 379/58 |
| 5,633,858 A | 5/1997 | Chang et al. | 370/255 |
| 5,633,866 A | 5/1997 | Callon | 370/401 |
| 5,684,800 A | 11/1997 | Dobbins et al. | 370/401 |
| 5,740,171 A | 4/1998 | Mazzola et al. | 370/392 |
| 5,742,604 A * | 4/1998 | Edsall et al. | 370/401 |
| 5,752,003 A | 5/1998 | Hart | 395/500 |
| 5,764,636 A | 6/1998 | Edsall | 370/401 |
| 5,796,732 A | 8/1998 | Mazzola et al. | 370/362 |
| 5,818,842 A | 10/1998 | Burwell et al. | 370/397 |
| 5,828,844 A | 10/1998 | Civanlar et al. | 395/200.58 |
| 5,852,607 A | 12/1998 | Chin | 370/401 |
| 5,872,783 A | 2/1999 | Chin | 370/392 |
| 5,898,686 A | 4/1999 | Virgile | 370/381 |
| 5,909,441 A | 6/1999 | Alexander, Jr. et al. | 370/395 |
| 5,909,550 A | 6/1999 | Shankar et al. | 395/200.57 |
| 6,014,380 A * | 1/2000 | Hendel et al. | 370/392 |
| 6,026,078 A * | 2/2000 | Smith | 370/258 |
| 6,172,990 B1 * | 1/2001 | Deb et al. | 370/474 |
| 6,226,771 B1 * | 5/2001 | Hilla et al. | 714/758 |
| 6,304,575 B1 * | 10/2001 | Carroll et al. | 370/408 |
| 6,483,812 B1 * | 11/2002 | Prorock | 370/252 |

OTHER PUBLICATIONS

The IBM 8209 LAN Bridge, Aamer Latif, Edward J. Rowlance, and R. Holt Adams, May 1992, pp. 28–37.

Understanding Token Ring Switching, Web, http://www-.cisco.com/univercd/cc/tduct/lan/cat3900/c3930ug/token.htm, Oct. 8, 1998, pp. 1–22.

Token Ring Inter–Switch Link Feature Summary, web, http://www.cisco.com/univercd/cc/tare/ios113ed/113t/113_4/trisl.htm, Oct. 8, 1998, pp. 1–26.

Draft Standard for Virtual Bridged Local Area Networks, LAN MAN Standards Committee, Feb., 1997, pp. 1–88.

Cisco VLAN Roadmap, web http://www.cisco.com/warp/public/538/7.htm, Jul. 15, 1998, pp. 1–9.

Cisco Announces Token–Ring Switching Products, Apr. 15, 1995, pp. 4–5.

U.S. application Ser. No. 09/266,198, Carroll et al., Filed Mar. 10, 1999.

U.S. application Ser. No. 09/266,239, Stuart et al., Filed Mar. 10, 1999.

U.S. application Ser. No. 09/266,241, Carroll et al., Filed Mar. 10, 1999.

\* cited by examiner

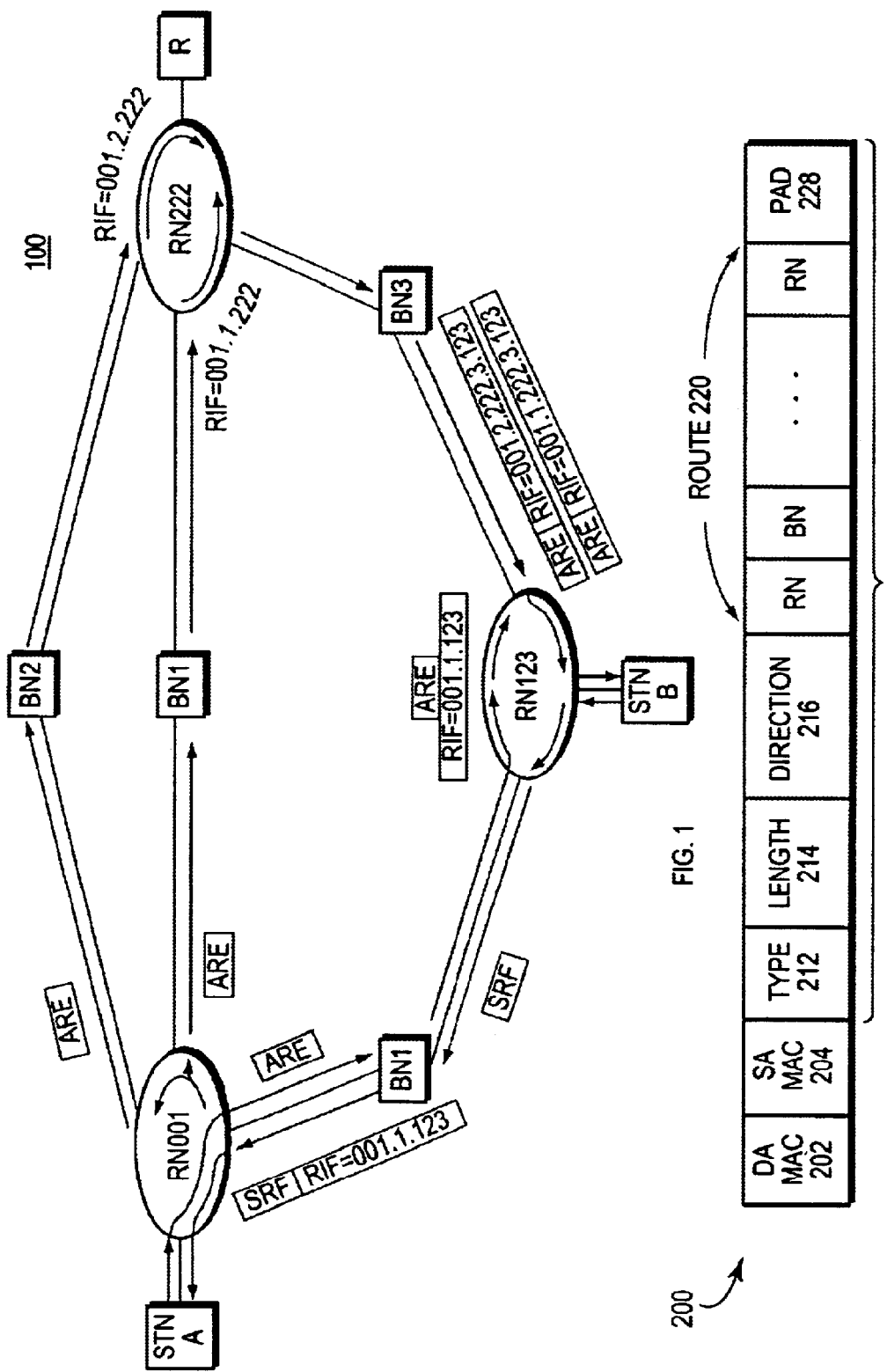

| VLAN ID 1110 | ADDRESS 1112 | PORT MASK INDICATOR 1114 | USED 1116 |
|---|---|---|---|
| | | | |
| | | | |
| ⋮ | ⋮ | ⋮ | ⋮ |
| | | | |

FIG. 11

SWITCHED TOKEN RING OVER ISL (TR-ISL) NETWORK

REFERENCE TO PROVISIONAL APPLICATION

This patent application claims the benefit under 35 U.S.C. §119(e) of U.S. Provisional Patent Application No. 60/110,332 titled, Distributed Token Ring Bridge Architecture, by Carson Stuart et al. and filed on Nov. 30, 1998.

CROSS-REFERENCE TO RELATED APPLICATIONS

This invention is related to the following copending U.S. Patent Applications:

U.S. Patent Application Ser. No. 09/266,239 titled, Token Ring Bridge Distributed in a Switched Fabric; now U.S. Pat. No. 6,563,832.

U.S. Patent Application Ser. No. 09/266,198 titled, Backup CRF VLAN; and

U.S. Patent Application Ser. No. 09/266,241 titled, Distributed Ring Protocol and Database, each of which was filed on even date herewith and assigned to the assignee of the present invention.

BACKGROUND OF THE INVENTION

Communication in a computer internetwork involves the exchange of data between two or more entities interconnected by communication media configured as local area networks (LANs) and wide area networks (WANs). The entities are typically software programs executing on hardware computer platforms, such as end stations and intermediate stations. In particular, communication software executing on the end stations correlate and manage data communication with other end stations. The stations typically communicate by exchanging discrete packets or frames of data according to predefined protocols. A protocol, in this context, consists of a set of rules defining how the stations interact with each other. For example, a LAN employs a data communication protocol (LAN standard), such as Token Ring, Ethernet or Token Bus, that defines the functions performed by the data link and physical layers of a communications architecture (i.e., a protocol stack).

To form a WAN, one or more intermediate devices are often used to interconnect multiple LANs. A bridge is an example of an intermediate station that may be used to provide a "bridging" function between two or more LANs to form a relatively small domain of stations, such as a subnetwork. Subnetworks or subnets provide an organizational overlay to an internetwork that facilitates transmission of data between the end stations. A switch may be utilized to provide a "switching" function for transferring information, such as data frames, between LANs. Typically, the switch is a computer having a plurality of ports that couple the switch to several LANs and to other switches. The switching function includes receiving data frames at an inbound port and transferring them to at least one outbound port of the switch. A router is an intermediate station that interconnects subnets and executes network routing software to allow expansion of communication to end stations of other subnets. Collectively, these hardware and software components comprise a communications internetwork.

FIG. 1 is a schematic block diagram of a conventional Token Ring (TR) internetwork 100 comprising a plurality of TR LANs interconnected by conventional bridges and a router (R). Each token ring is assigned a ring number (RN), such as RN001, RN222 and RN123, and each bridge is assigned a bridge number (BN), such as BN1–3. The RNs assigned to the token rings must be unique within each bridged TR subnetwork that extends to the router. That is, RNs assigned to the token rings within each subnetwork must be different, although BNs assigned to the bridges within each subnetwork may be similar. An exception to this latter rule involves the use of redundant bridges coupling common TR LANs; here, the redundant bridges must have unique BNs in order to distinguish one another.

In the TR internetwork, there may be multiple paths between a source end station and a destination end station. To send a TR frame from a source (such as Station A) to a destination (such as Station B) along a particular path of the internetwork, the source may insert information within a routing information field (RIF) of the frame that specifies the particular path to the destination. FIG. 2 is a schematic diagram of a portion of a conventional TR frame 200 comprising destination address (DA) and source address (SA) medium access control (MAC) fields 202–204 and a RIF header 210. The RIF header 210, in turn, comprises a type (TYPE) field 212, a RIF length indicator (LENGTH) field 214, a direction bit (DIRECTION) field 216 and a ROUTE field 220 that may include a plurality of RN/BN pairs needed to describe the path. Each RN/BN pair comprises 2 bytes, wherein the RN is 12 bits and the BN is 4 bits. The RIF header 210 terminates with a 4-bit padding (PAD) field 228 of zeros.

The source typically acquires the information for insertion into the RIF through the issuance of a special TR frame called an All Routes Explorer (ARE) frame that is broadcasted throughout the TR subnetwork. An ARE frame is typically used to find all paths to a particular destination; an example of a frame used to strictly find the destination is a Spanning Tree Explorer (STE) frame. The STE frame only propagates over network segments that are along a defined spanning tree path to the destination; consequently, the destination only receives one copy of the frame. Execution of a spanning tree algorithm within the bridges results in blocking of certain ports to obviate propagation of frames around loops.

Source Route Bridging (SRB) describes a bridging technique that forwards TR frames based on the RIF information stored in the frame; an example of a frame that has a RIF is called a Specifically Routed Frame (SRF). In contrast, Transparent Bridging (TB) is a bridging technique that forwards TR frames based on their MAC addresses using a forwarding table. Source Route Transparent (SRT) bridging is a merging of the SRB and TB techniques; that is, if there is a RIF in the frame transported over an SRT bridge network, forwarding decisions are based on that RIF, whereas if there is no RIF in the frame, forwarding decisions are made based on the MAC address of the frame using the forwarding table. A TR frame that does not have a RIF is called a Non-Source Route (NSR) frame.

When issuing an ARE frame, the source (Stn A) initially sets the RIF length 214 to "2" (the length of the header 210) signifying that there is no information contained in the route field 220 of the RIF, and loads the type field 212 of the header with information specifying the type of frame, e.g., an ARE frame. Stn A then transmits the ARE frame over token ring RN001 where it is received by each station, including each bridge, connected to the token ring. Upon receiving the frame, each bridge inserts information into the RIF prior to forwarding a copy of the ARE frame onto its connected token ring.

In general, each bridge inserts into the RIF (i) its bridge number and (ii) the ring number of the token ring to which it is forwarding the frame; however, when a bridge receives an ARE frame having a RIF length of "2", the bridge also inserts into the RIF the ring number of the token ring from which the frame is received. For example, a first BN1 inserts into the RIF the following information: the RN of the token ring from which the frame is received, its BN and the RN of the ring to which it is forwarding the frame <001.1.123>. The contents of the RIF thus describe the path followed by the ARE frame to reach token ring RN123.

The RIF contents for other copies of the ARE frame broadcasted throughout the TR subnetwork include (i) RIF= <001.1.222>and (ii) RIF=<001.2.222>. These copies of the ARE frame are forwarded over RN222 and the bridges connected to the ring update the RIF of the ARE frames prior to forwarding them to their connected LANs. For example when bridge BN3 forwards the ARE frame to RN123, it updates the RIF header 210, including the length field 214, as a result of inserting its bridge number and connected ring number into the RIF. Thus, the contents of the RIF of an ARE frame propagating over RN123 are <001.1.222.3.123>. Destination (Stn B) receives three ARE frames, one of which has a RIF with contents <001.1.123>, another having RIF contents <001.1.222.3.123>and a third having RIF contents of <001.2.222.3.123>.

Stn B chooses one of the ARE frames (and its RIF contents) as the route over which it returns a response frame; typically, the destination chooses the frame it received first, which may be the frame having the shortest RIF to the source. Stn B thus returns a SRF frame to the source over a path <001.1.123>specified in the RIF. The frame type is indicated as a SRF frame and the direction bit is altered to enable interpretation of the contents of the RIF. In the case of a response frame, the direction bit is inverted to denote that the RIF contents are interpreted in a reverse direction to describe the path to the source.

In general, a properly functioning bridge does not forward a copy of a STE frame or an ARE frame back over a token ring from which it has already traversed. When the ARE frame is "flooded" over RN001, one copy of the frame is received by bridge BN2 and forwarded to RN222, while another copy of the frame is received at a second BN1 and forwarded to RN222. Because each of these bridges reside on the same token ring, the copy of the frame forwarded over RN222 from BN2 is received by BN1 and, similarly, the copy of the frame forwarded over RN222 by BN1 is received by BN2. Yet, those bridges do not forward copies of the frames back onto RN001 because the ARE frames previously traversed that ring. Specifically, BN1 examines the contents of the RIF and, upon detecting that the ARE frame had previously traversed RN001, blocks its port to that token ring. Blocking of the port effectively discards the frame and prevents it from circulating endlessly around a loop, while also preventing end stations from receiving multiple copies of the frame.

A token ring network is typically implemented through the use of TR concentrators (or "hubs") interconnected in a "daisy chain" manner, wherein each concentrator is coupled to end stations via point-to-point wire cables 310. FIG. 3 is a schematic diagram of a conventional TR concentrator network arrangement 300. Collectively, the interconnected concentrators 302–308 form a physical loop/ring configuration that starts at a first TR concentrator 302 and continues through each end station coupled to the concentrator; this configuration extends to each connected TR concentrator up to a last concentrator 308, where it "loops-back" to the first concentrator. Access to the ring is determined in accordance with a token message that propagates among all of the end stations coupled to the ring. A problem with this conventional network arrangement involves the limited bandwidth available to each station over the cables 310; for example, all stations coupled to the physical token ring share 16 megabits per second (Mbps) of bandwidth. In contrast, intermediate stations (switches) in an Ethernet environment are interconnected by 100 Mbps "pipes" that increase the bandwidth available per station.

One way to achieve additional bandwidth in a token ring environment is to apportion the token ring into smaller subrings, each of which is coupled to a bridge. Yet, apportioning a token ring network into subrings requires careful consideration because of the limitations associated with token ring networks. Since each ring number comprises 12 bits, there is only a finite number of ring numbers available per subnet. The total length of the RIF of a TR frame is less than or equal to 30 bytes, thus limiting the RIF to a total of fourteen (14) RN/BN pairs for the typical TR frame 200. Moreover, subrings do not generally scale well for modern networking environments wherein each server coupled to the network requires its own TR concentrator to achieve necessary bandwidth requirements.

Another approach to increasing bandwidth in a token ring environment involves the use of intermediate stations that are compatible with the Dedicated Token Ring (DTR) bridge standard promulgated by the Institute of Electrical and Electronics Engineers (IEEE) in Annex K to the IEEE 802.5 standard (hereinafter "Annex K"), which governs token ring LANs. Annex K defines a 2-tier switching model for a single LAN switch containing a Bridge Relay Function (BRF) to bridge between ports of different ring numbers and a Concentrator Relay Function (CRF) to switch between ports of the same ring number.

FIG. 4 is a schematic diagram of a switch 400 containing a plurality of CRFs (CRF111–333) coupled to a BRF1 to provide bridging and switching operations among physical token ring (TR) media/segments coupled to the switch. Each CRF has a plurality of ports that interconnect a plurality of TR segments into one logical token ring having a single ring number. This arrangement is advantageous because it increases the total available bandwidth per logical token ring. That is, for a 4-port switch arrangement, a total of 64 Mbps of bandwidth is available for, e.g., CRF111.

Functionally, the CRF "switches" TR frames from one TR segment to another, while the BRF "bridges" those frames between different CRFs. That is, rather than or in addition to forwarding frames from one TR segment to another, CRF111 may pass them to its associated BRF1 which may, in turn, forward the frames to CRF222. CRF222 may then forward the frames over one of its TR segments. Thus, the 2-tier switching model allows BRF1 to transfer TR frames between different logical token ring numbers.

FIG. 5 is a schematic block diagram of a conventional bridging arrangement 500 comprising a plurality of switches SW1∝2 with a plurality of BRFs (BRF1–3), each of which is coupled to a plurality of CRFs. In general, coupling of a BRF to the CRFs forms a subnetwork; multiple subnetworks may then be interconnected by a router (R) located internal (or external) to a switch. However, a CRF may be extended from one physical location to another using a wire 510 that connects one port of the CRF in a switch to another port of the CRF in another switch.

For example, CRF222 may be defined in each switch SW1–2 and its function logically extended between the switches by coupling two ports through the wire 510. Although this enables its ports to occupy a single logical ring number, CRF222 is logically coupled between two different BRFs (BRF1 and BRF2). Each BRF in the switches has an assigned bridge number and constitutes a bridge hop. Notably, the wire 510 used to couple the CRF ports of the switches SW1–2 is generally similar to the cable 310 coupling stations/concentrators of a token ring and, thus, supports 16 Mbps of bandwidth.

In addition to subnets, a computer internetwork may be segregated into a series of network groups. For example, U.S. Pat. No. 5,394,402, to Ross (the "'402 Patent") discloses an arrangement that is capable of associating any port of a switch with any particular segregated network group. According to the '402 Patent, any number of physical ports of a particular switch may be associated with any number of groups within the switch by using a virtual local area network (VLAN) arrangement that virtually associates the port with a particular VLAN designation. Ross discloses a system that associates VLAN designations with at least one internal switch port and further associates those VLAN designations with messages transmitted from any of the ports to which the VLAN designation has been assigned. Thus, those entities having the same VLAN designation function as if they are all part of the same LAN.

The VLAN designation for each internal port is stored in a memory portion of the switch such that every time a message is received by the switch on an internal port the VLAN designation of that port is associated with the message. Association is accomplished by a flow processing element which looks up the VLAN designation in a memory based on the internal port where the message originated. Message exchanges between parts of the network having different VLAN designations are specifically prevented in order to preserve the boundaries of each VLAN segment. In addition to the '402 patent, the Institute of Electrical and Electronics Engineers (IEEE) is preparing a standard for Virtual Bridged Local Area Networks. See IEEE Standard 802.1q (draft).

U.S. Pat. No. 5,742,604, titled Interswitch Link Mechanism for Connecting High-Performance Network Switches, by Edsall et al. (the "'604 patent") discloses an inter-switch link (ISL) encapsulation mechanism for efficiently transporting packets or frames, including VLAN-modified frames, between switches while maintaining the VLAN association of the frames. This patent, which is commonly owned with the present application, discloses an ISL link that connects ISL interface circuitry disposed at two switches. The transmitting ISL circuitry encapsulates the frame being transported within an ISL header and ISL error detection information, while the ISL receiving circuitry strips off this information and recovers the original frame.

FIG. 6 is a block diagram of an ISL encapsulated frame 600. The encapsulated frame 600 includes an original frame, such as Ethernet frame 602, that is encapsulated within an ISL header 604 including an ISL CRC field 606. The Ethernet frame 602 includes a plurality of well-known fields, such as a Medium Access Control (MAC) destination address (DA) 608, a MAC source address (SA) 610, a data field 612 and an Ethernet frame check sequence (FCS) field 614, among others. The ISL header 604 comprises a plurality of fields including an ISL DA field 616, a type field 618, an ISL SA field 620, a length (LEN) field 622 and a VLAN identifier (ID) field 624.

The ISL DA field 616 identifies the ISL interface circuitry of the receiving switch and may be a multicast or unicast address. The type field 618 indicates the type of original frame that is encapsulated. The ISL SA field 620 may identify the ISL interface circuitry forwarding the frame 600 and the length field 622 indicates the length of frame 600. The VLAN ID field 624 carries the VLAN designation associated with the original frame 602 being encapsulated. To the extent the original frame 602 includes its own VLAN ID field, such as a Tag Protocol Identifier Field (TPID) field as specified in the IEEE 802.1q draft standard, this designation may be repeated in field 624. In addition, the ISL encapsulated frame 600 includes an ISL FCS field 606 that is loaded with error detection values (such as cyclic redundancy checks) by the transmitting switch prior to forwarding the frame 600 over the ISL link.

As noted, an example of the original frame format encapsulated by the ISL header 604 is an Ethernet frame 602. Prior attempts to transport token ring (TR) frames over an ISL link connecting ISL interface circuitry disposed at two switches required translation of TR frames to Ethernet format. The present invention is directed to an encapsulation technique for transporting TR frames in their native TR formats over an ISL link.

SUMMARY OF THE INVENTION

The invention relates to a technique for efficiently transporting token ring (TR) frames over trunks interconnecting switches of a distributed TR bridge. The TR bridge is characterized by a logical switch fabric that is distributed among the interconnected switches by the trunks, which are preferably interswitch link (ISL) trunks. Each switch includes a Bridge Relay Function (BRF) coupled to a plurality of Concentrator Relay Functions (CRFs) having a plurality of ports for receiving TR frames over TR segments. The BRF and CRF of the distributed TR bridge operate according to a 2-tier switching model wherein each CRF and BRF is assigned an individual virtual local area network (VLAN) identifier.

According to the invention, the technique encapsulates the TR frames in a TR-ISL protocol format that accomodates differences in formats of various TR frames. The novel s protocol comprises a TR-ISL header having a destination VLAN field, a source VLAN field, a destination route descriptor (RD) field, a source RD field, an F field and an E size field. The contents of the E size field specify the extent of padding (if necessary) for the encapsulated TR frame. The F field contains an FCS not present indicator, whereas the contents of the source and destination RD fields are used for forwarding decision operations, as in the case of a Specifically Routed Frame, an All Routes Explorer frame or a Spanning Tree Explorer frame. If there are no RD contents in these fields, as in the case of a Non-Source Route frame, the forwarding decision is based on a destination medium access control address.

In the illustrative embodiment, the 2-tier switching arrangement is further governed by special inbound frame processing and forwarding rules required to select target ports for the frames. Specifically, parsing operations are performed on an incoming frame at a switch to compute the contents of the destination and source VLAN fields of the TR-ISL header, along with the source and destination RD fields. The computed information is carried with the incoming frame and used by interface circuitry of each switch to access a modified forwarding table when rendering a forwarding decision for the frame. The novel TR-ISL protocol format accomodates the computed information needed to comport with the 2-tier switching model of the distributed TR bridge and the special processing/forwarding rules.

Advantageously, the invention obviates the need to translate TR frames to an Ethernet format (and vice versa) when those frames are forwarded over a trunk link, such as ISL. This is particularly useful in multi-path networks wherein translation is often not an option since it prevents use of alternate paths and limits performance in such networks. In addition, the invention facilitates reconfiguration of a network of switches by adding ISL links and switches without requiring changes to ring numbers in the network and without adding additional hops in the routing information field of the TR frames.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 1 is a schematic block diagram of a conventional Token Ring (TR) internetwork comprising a plurality of TR local area networks interconnected by conventional bridges and a router;

FIG. 2 is a schematic diagram of a portion of a conventional TR frame;

FIG. 11 is a schematic block diagram of an illustrative embodiment of a modified forwarding table used to select a destination port or ports for receiving a TR frame according to the present invention;

DETAILED DESCRIPTION OF AN ILLUSTRATIVE EMBODIMENT

Figure 7:
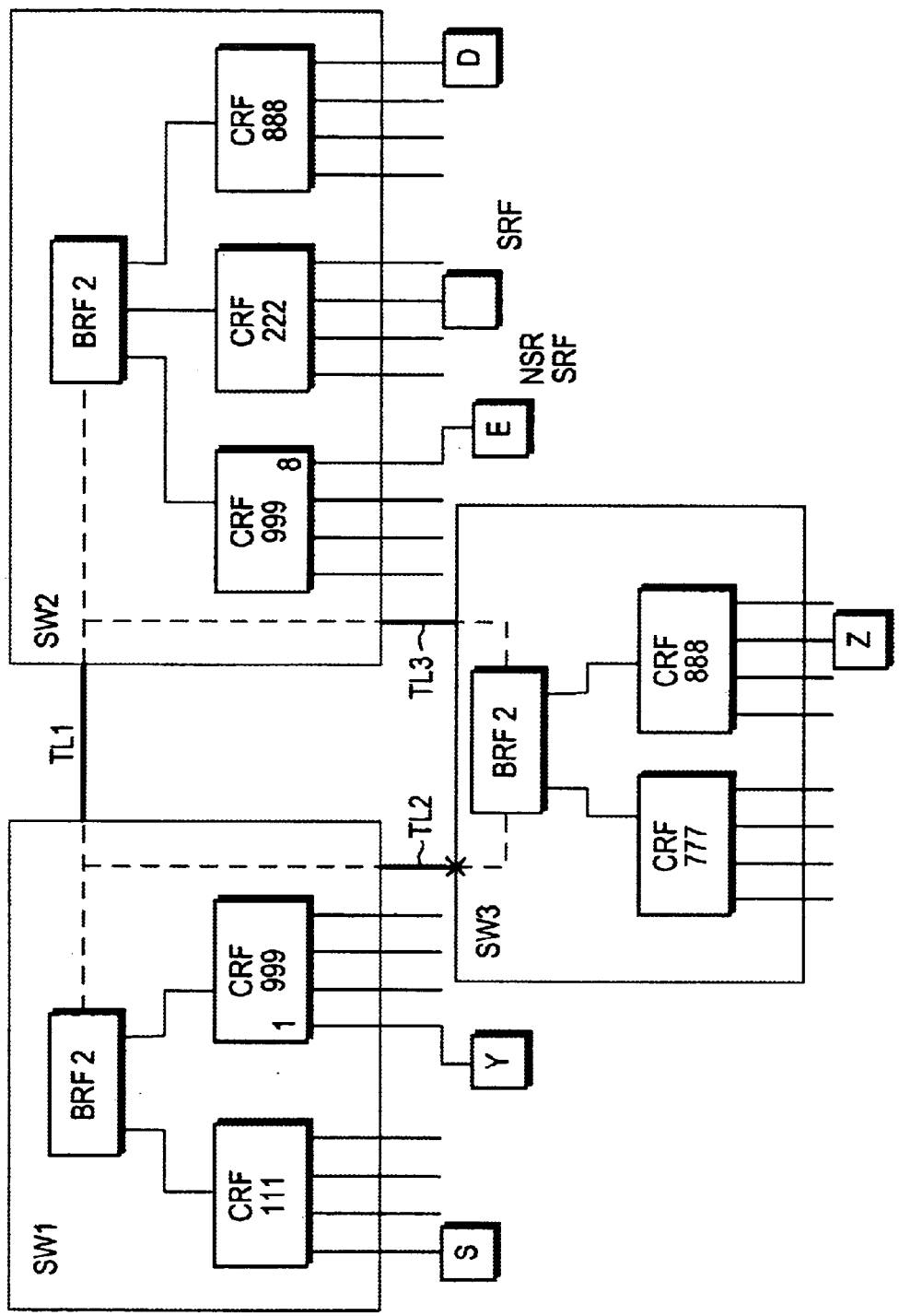
FIG. 7 is a schematic diagram of a TR bridge distributed in a switched fabric that may be advantageously used with the present invention.

FIG. 7 is a schematic diagram of a token ring (TR) bridge distributed in a switched fabric. The distributed TR bridge 700 includes three TR switches SW1–3, each having a Bridge Relay Function (BRF) logically coupled to a plurality of Concentrator Relay Functions (CRFs); moreover, each CRF has TR ports associated therewith. The physical relationship between ports and bridges in a conventional bridging environment is effectively transformed into a logical relationship between CRFs and BRFs in the distributed TR switching environment. Each CRF and BRF of the distributed TR bridge is assigned an individual virtual local area network (VLAN) in a "2-tier" arrangement. That is, each CRF is assigned a VLAN identification (ID) and the logically-coupled BRF is assigned its own overlapping/encompassing VLAN ID. An example of a distributed TR bridge that may be advantageously used with the present invention is described in copending and commonly assigned U.S. patent application Ser. No. 09/266,239, titled Token Ring Bridge Distributed in a Switched Fabric by Carson Stuart et al, which application is incorporated by reference as though fully set forth herein.

Specifically, the BRF function (denoted BRF2) is logically distributed across switches SW1–3 so as to create a single BRF distributed switch fabric that spans a plurality of (e.g., three) physically distinct locations. Instead of having a non-disperse BRF in each switch (as described in Annex K), the function of a particular BRF is extended among multiple switches in a distributed manner. The distributed BRF environment may be further extended to include a distributed CRF arrangement. Although there may be multiple physical rings coupled to a CRF, the CRF defines a single ring number (RN) and the multiple physical rings are logically associated as a single ring. Thus, a CRF (e.g., CRF999) contained within a switch (e.g., SW1) may be distributed among at least one other switch (e.g., SW2). Physical token rings are coupled to each CRF such that only end stations (users) need be associated with each ring.

Figure 8:
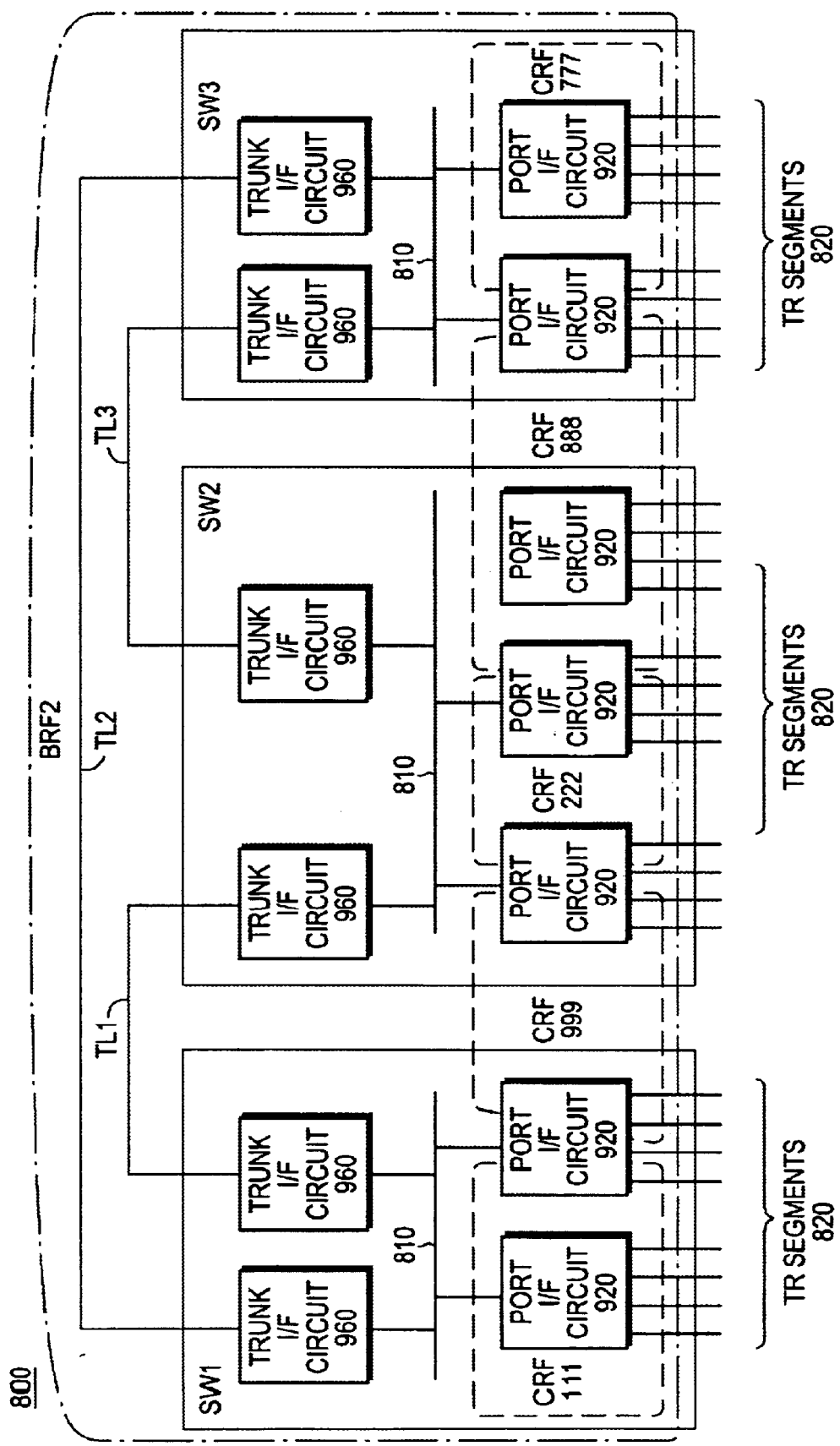
FIG. 8 is a schematic block diagram of an illustrative embodiment of a network switch platform having a plurality of switches configured as a distributed TR bridge.

FIG. 8 is a schematic block diagram of an illustrative embodiment of a network switch platform configured as a distributed TR bridge 800. The distributed bridge platform comprises three switches SW1–3, each including port interface (I/F) circuitry 920 and trunk interface (I/F) circuitry 960 interconnected by a bus 810. The port interface circuitry 920 includes a plurality of TR ports that interconnect a plurality of TR media segments 820, whereas the trunk interface circuitry 960 are interconnected by trunk links TL1–3. The distributed bridge further comprises BRF/CRF constructs "overlayed" onto the platform circuitry to create a logically-defined relationship among the ports and CRFs, and among the switches and distributed BRF.

The port interface circuits are organized and defined as CRF111, 999, 222, 888 and 777, whereas the interconnected port and trunk interface circuits are organized and defined as a BRF that is distributed among the switches SW1–3 to create a single logical switch fabric. The trunk links may comprise any type of physical link configured as a local area network (LAN) or wide area network (WAN) link. An example of a trunk link that may be used with the present invention is described in commonly-assigned U.S. Pat. No. 5,742,604, titled Interswitch Link Mechanism for Connecting High-Performance Network Switches, by Edsall et al. (the "'604 patent").

Source route bridging (SRB) and/or source route transparent bridging (SRT) operations are supported between physical token rings of the distributed bridge environment. Any BRF or CRF, including the physical token rings coupled to the CRF, may be located in any switch coupled to the distributed bridge. When configuring the distributed bridge, the BRF bridge number (BN) within each switch is initially defined and the CRF RNs associated with the BRF are defined. From a configuration point of view, ports are associated with a CRF and CRFs are associated with a BRF. For example, rings/ports coupled to CRF222 may be physically coupled to SW2, yet may be also logically associated with SW1,3. This configuration information is provided to all of the BRFs associated with the distributed TR bridge.

Distributing a BRF function among different switches requires "knowledge" on behalf of the BRF of those CRFs that are associated with the bridging function, yet that reside on the different switches. For example, BRF2 on SW1 must be aware that it is logically associated with CRF222 on SW2 and BRF2 on SW2 must be aware that it is logically associated with CRF111 on SW1. Typically, a conventional bridge acquires such knowledge through configuration management capabilities that provide configuration information such as the bridge number of the bridge, the bridging type of the bridge, the ring numbers associated with the bridge and the medium access control (MAC) address of the bridge. Likewise, configuration information such as the BRF number, bridging type of the BRF, MAC address of the BRF and CRF numbers associated with the BRF need to be provided to the components of the distributed TR bridge. Such configuration information is contained in modified forwarding tables.

Figure 9:
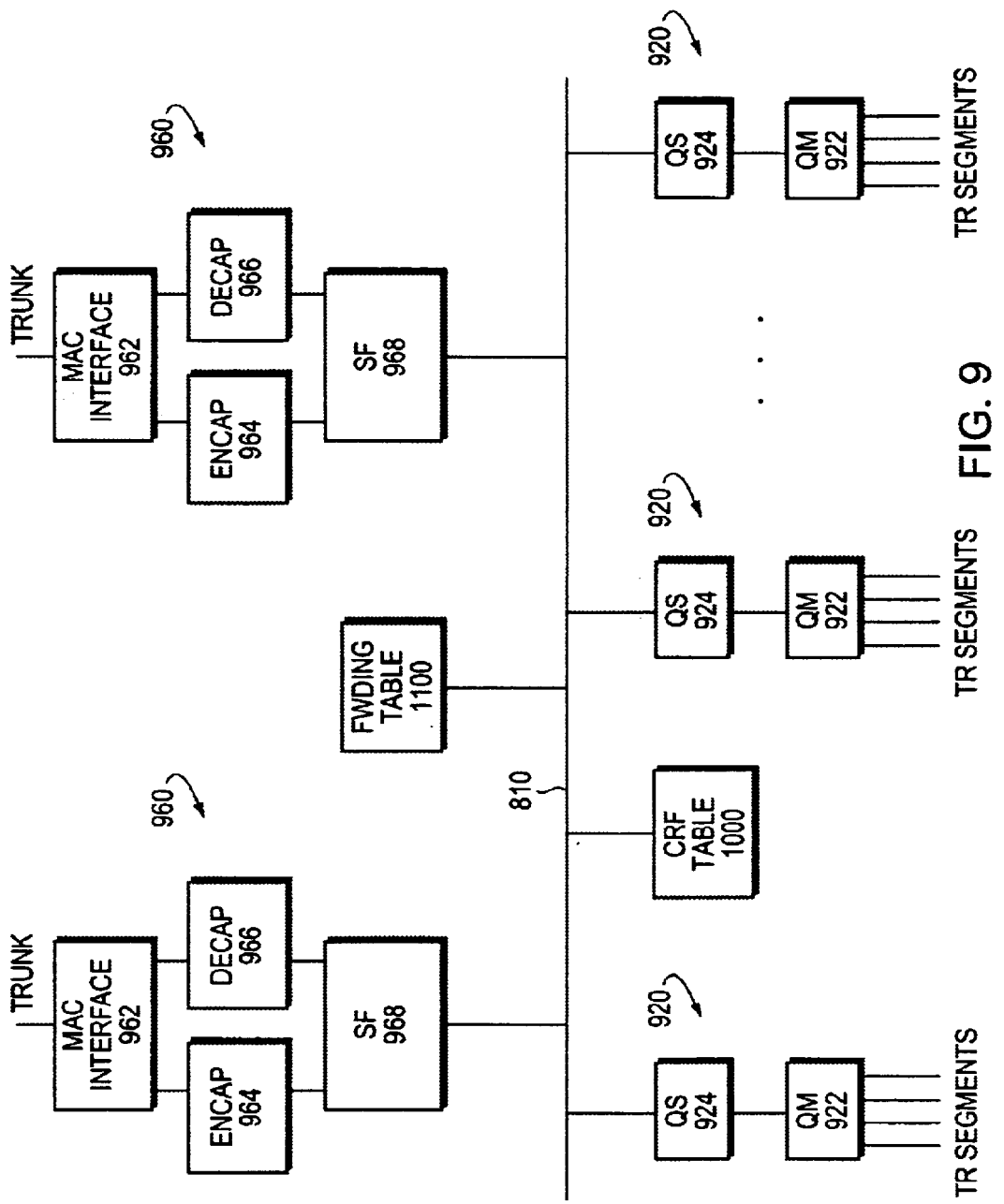
FIG. 9 is a schematic block diagram of trunk and port interface circuitry contained within each switch of the distributed TR bridge.

FIG. 9 is a schematic block diagram of the port interface circuitry 920 and trunk interface circuitry 960 of each switch. In the illustrative embodiment, a single, central modified forwarding table 1100 and a single, central CRF table 1000 are used, although the invention may apply equally to a distributed table arrangement. It should be noted, however, that FIGS. 7–9 illustrate an embodiment of the invention wherein a single BRF is distributed among the switches of the distributed TR bridge; for an alternate embodiment having multiple BRFs distributed among the switches, a separate CRF table is required per BRF.

The trunk interface circuitry 960 comprises a MAC interface circuit 962 coupled to a switch fabric interface (SF) device 968 by way of trunk encapsulation (ENCAP) and decapsulation (DECAP) circuits 964 and 966. The circuits cooperate to provide interswitch link (ISL) circuitry used to encapsulate/decapsulate frames with information that is forwarded over/received from the trunks, as described further herein. The MAC interface 962 provides an IEEE 802.x service layer for moving frames to and from the trunking links, whereas the SF device 968 is configured to perform data buffering and frame manipulation, as well as filtering, look-up and forwarding decision operations using the tables.

The port interface circuitry 920 comprises a Quad Medium access control (QM) device 922 and a Quad Switch fabric interface (QS) device 924. Each QS device 924 preferably services four (4) ports via a QM device 922. The QM 922 comprises MAC circuitry that preferably provides an IEEE 802.5 service layer for moving the frames to and from the TR segments; more specifically, the MAC capability allows attachment of the switch to a network entity, such as a processor or similar circuit that interfaces with LAN medium connections. The QS 924 is preferably a multi-port switching device configured to perform data buffering and frame manipulation, as well as filtering, look-up and forwarding decision operations using the tables. Accordingly, the forwarding decision circuitry embodied in the QS and SF devices is actually distributed and, thus, collectively these circuits provide the "intelligence" for switching and bridging frames throughout the TR bridge in a distributed switching processing arrangement.

Figure 10:
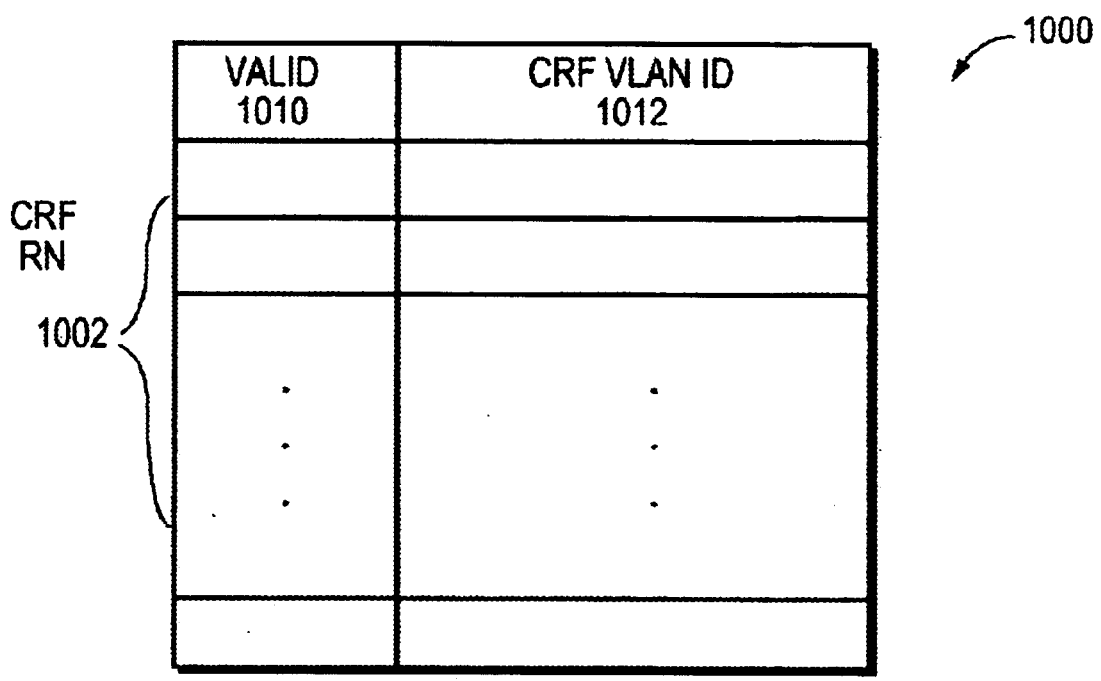
FIG. 10 is a schematic diagram of a CRF table according to the present invention.

FIG. 10 is a schematic diagram of the CRF table 1000 which comprises a plurality of entries 1002 indexed by the RN of a CRF and which, for each entry, contains (i) a valid bit field 1010 whose content indicates whether the RN corresponds to a CRF associated with a particular BRF and (ii) a field 1012 containing the CRF VLAN ID corresponding to the CRF RN. The port interface circuitry process an incoming frame by, inter alia, performing look-up operations into the CRF and modified forwarding tables to enable rendering of a forwarding/switching decision over the distributed bridge as described further herein.

FIG. 11 is a schematic block diagram of an illustrative embodiment of the modified forwarding table 1100 having a plurality of entries 1102 used to select a destination port or ports for receiving a frame. For this embodiment of the invention, each entry of the forwarding table preferably contains (1) a VLAN ID field 1110; (2) an address (a MAC or route descriptor, RD) field 1112; (3) an indicator, such as a port bit mask (per switch), field 1114 indicating which ports should receive the frame within the switch; and (4) a "used" field 1116 containing a bit for aging-out the entry. Each time the entry is accessed or "used", the used bit is asserted. Execution of a conventional aging algorithm results in the examination of the state of this bit when determining which entries to "age" or delete from the table.

Examples of a mechanism used to "look-up" an entry in the forwarding table 1100 may include a hash table, a tree and a content addressable memory. However, it will be apparent to those skilled in the art that the actual mechanism is implementation-dependent and, thus, further examples are contemplated by the invention. The keys used for such look-up operations are preferably the VLAN ID and address fields contents. A configuration synchronization protocol may be employed to update each forwarding table associated with each switch to ensure their consistency and coherency.

TR-ISL Encapsulated Frame

The '604 patent discloses an ISL encapsulation mechanism for efficiently transporting packets or frames, including VLAN modified frames, between switches while maintaining the VLAN association of the frames. An ISL link connects ISL interface circuitry disposed at two switches. Transmitting ISL circuitry encapsulates the frame being transported within an ISL header and ISL error detection information, while the ISL receiving circuitry strips off this information and recovers the original frame. An example of the original frame format encapsulated by the ISL header is an Ethernet frame. Prior attempts to transport TR frames over an ISL link connecting two switches required translation of TR frames to Ethernet format. The present invention is directed, in part, to an encapsulation technique for efficiently transporting TR frames in their native TR formats over an ISL link.

In accordance with the present invention, the technique comprises encapsulating a TR frame within an extended ISL header that stores, inter alia, the source VLAN of the frame. For such TR encapsulation, the extended ISL header includes two components: a primary ISL header that is generally similar to the conventional ISL header 604 (FIG. 6) and a TR-ISL header that includes additional fields related to the encapsulated TR frame. The enhanced technique modifies the conventional ISL mechanism to accomodate (i) differences in formats of various TR frames, (ii) the 2-tier switching model of the TR switching network and (iii) special frame processing and forwarding rules required to select targets for the TR frames.

Figure 12:
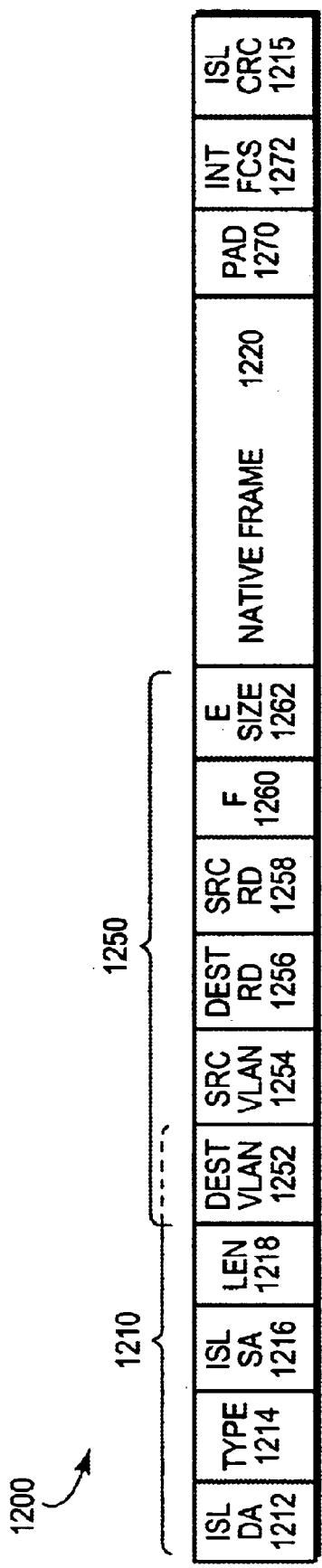
FIG. 12 is a schematic block diagram of an enhanced ISL header that includes an illustrative embodiment of a TR-ISL header according to the present invention.

FIG. 12 is a schematic block diagram of the novel TR-ISL encapsulated frame 1200 that includes a TR-ISL header field 1250 in addition to an ISL header 1210. The Type field 1214 identifies a type of native frame 1220 (e.g., TR or Ethernet frame) encapsulated within the enhanced header. For example, the distributed TR bridge (FIGS. 7–8) may comprise TR ports coupled to CRF888 of SW2 in communicating relation with a TR port coupled to a CRF111 of SW1 over an ISL link TL1 configured to support TR frames. It should be noted, however, that the enhanced ISL encapsulation technique supports further frame types/protocols, such as Fiber Distributed Data Interface (FDDI) or Asynchronous Transfer Mode (ATM), that may be simultaneously transported over the ISL link.

Figure 3:
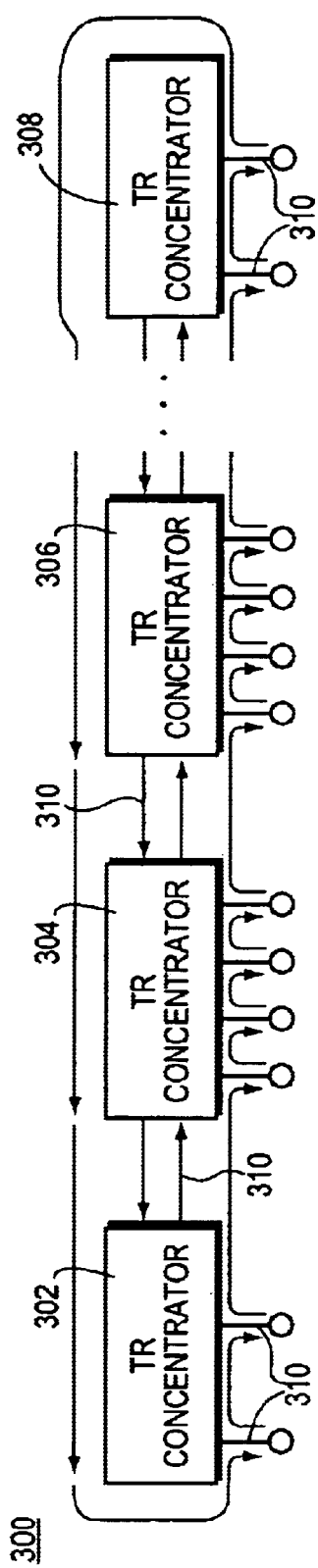
FIG. 3 is a schematic diagram of a conventional TR concentrator network arrangement.
Figure 4:
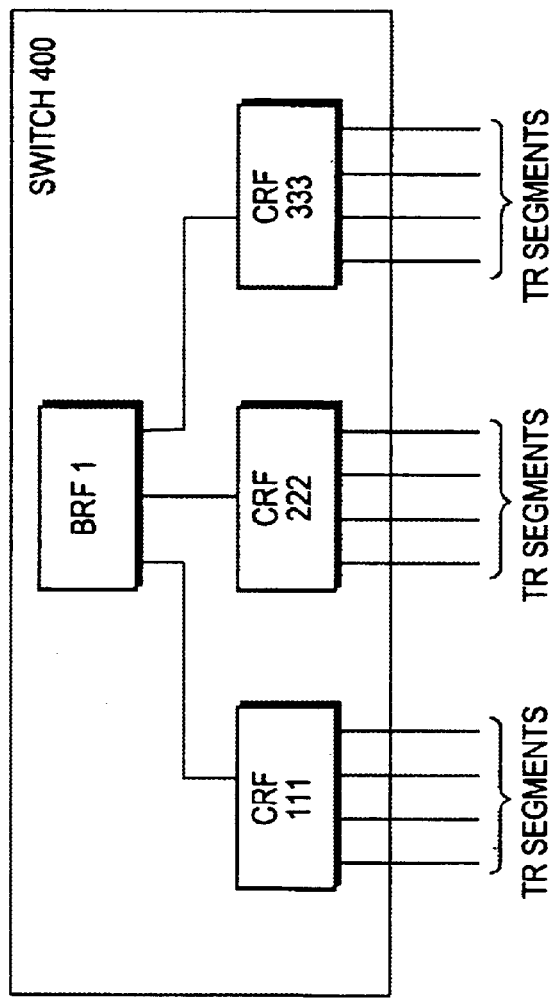
FIG. 4 is a schematic diagram of a switch containing a plurality of Concentrator Relay Functions (CRFs) coupled to a Bridge Relay Function (BRF) to provide bridging and switching operations among physical TR media/segments coupled to a switch.
Figure 5:
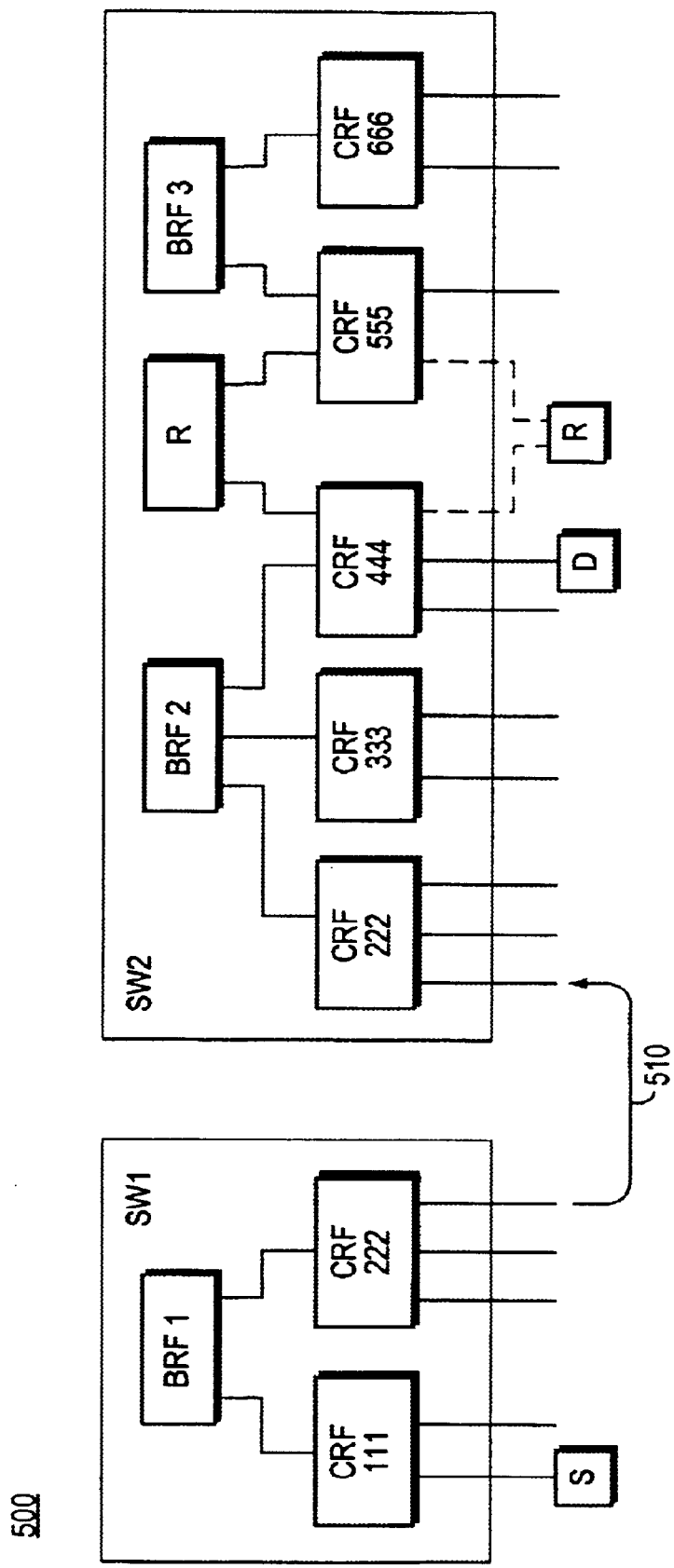
FIG. 5 is a schematic block diagram a conventional bridging arrangement comprising a plurality of switches with a plurality of BRFs, each of which is coupled to a plurality of CRFs.
Figure 6:
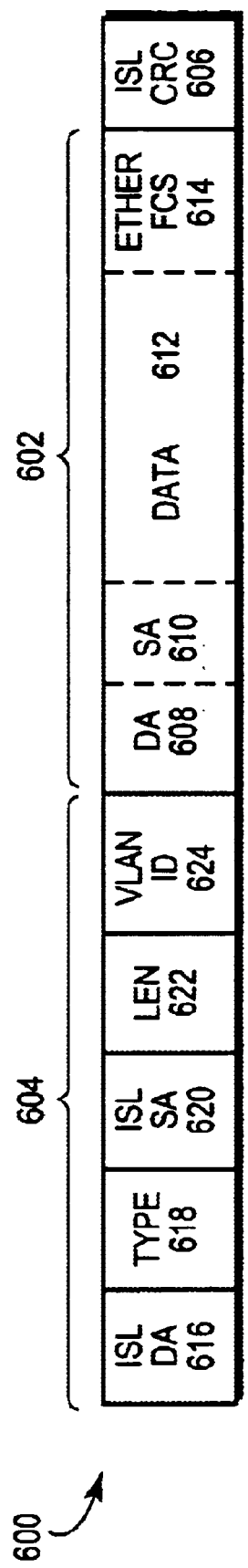
FIG. 6 is a schematic block diagram of an interswitch link (ISL) encapsulated frame.

The TR-ISL header 1250 includes a destination VLAN field 1252, a source VLAN field 1254, a destination RD field 1256, a source RD field 1258, an F field 1260 and an E size field 1262. Note that the destination VLAN field 1252 effectively replaces the VLAN ID field 624 of the ISL header 604 (FIG. 6). The contents of the E size field 1262 specify the extent of padding, if necessary, for the encapsulated TR frame (via a pad field 1270). According to the conventional ISL mechanism, the minimum size packet transferred over an ISL link is at least equal to a minimum size Ethernet frame. Yet, TR frames may be quite small despite the overhead associated with the TR-ISL fields. In the illustrative embodiment, if the E field contains a zero value, then no padding is present in the frame. On the other hand, if the E field contains a non-zero value, then that non-zero value represents the actual size of the native frame before padding is added to the field 1270.

The F field 1262 contains a 1-bit FCS not present indicator. In the illustrative embodiment, if the F bit is asserted, then an FCS is not present in the native TR frame 1220. This situation may arise when an inbound port "strips" the FCS from an incoming TR frame because the RIF was modified, thus invalidating the FCS. In this case, the inbound port can either (i) recompute a new TR cyclic redundancy check (CRC), add it to the native TR frame and clear the F-bit, or (ii) set the F-bit. If there is an FCS present in the TR frame, it is carried within the native frame and F bit is not asserted. The TR-ISL is header 1252 also includes an intermediate (INT) FCS field 1272 that contains a calculated FCS value for the TR-ISL level of encapsulation (including the SRC VLAN 1254, DEST RD 1256, SRC RD 1258, F 1260, E-SIZE 1262, NATIVE FRAME 1220 and PAD 1270). This is provided to maintain consistency with the Ethernet FCS in the Ethernet format of ISL. An alternate implementation of the invention could omit the INT FCS 1272. An example of an error detection generator for calculating error detection values that may be advantageously used with the present invention is described in copending and commonly-assigned U.S. patent application Ser. No. 09/211,682 titled Improved Method and Apparatus for Generating Error Detection Data for Encapsulated Frames by James M. Edwards et al., which application is hereby incorporated by reference as though fully set forth herein.

It should be noted that the contents of the source and destination RD fields 1258, 1256 are generally used for forwarding decision operations and, as such, describe the addresses of bridges that are adjacent to the edges of the inbound CRF. That is, the destination RD field 1256 describes a destination bridge (as opposed to a destination end station), while the source RD field 1258 describes a source bridge (as opposed to a source end station). The source RD field contents are used to "learn" the source bridge when a response is returned from a destination. Therefore, the destination and source RD fields are used in a manner similar to a conventional bridge for purposes of forwarding (destination RD) and learning (source RD). This information is loaded into the TR-ISL header 1250 and used by forwarding decision circuitry of the switch to perform switching/bridging operations for the frame. By storing this information in the appropriate TR-ISL header fields, the native TR frame 1220 does not need to be reprocessed and/or reparsed when rendering the forwarding decision.

In the illustrative embodiment, when the source or destination RD field is loaded with a zero value, the forwarding decision or learning decision process is based on the destination or source MAC address. In other words, if the destination RD field is equal to zero, the forwarding engine circuitry uses the destination MAC address of the TR frame to render its destination selection decision and if the source RD field is equal to zero, the learning engine circuitry uses the source MAC address to perform its function.

Inbound Frame Processing (Ports Only)

To faciliate such learning and destination selection, inbound frame parsing is performed on frames received from an external interface of a switch to compute the contents of the destination and source VLAN fields of the TR-ISL header, along with the source and destination RD fields. This computed information is carried with the incoming frame and used by the port interface circuitry to access the appropriate table (e.g., the modified forwarding table 1100) when rendering a forwarding (or learning) decision for the frame. For each inbound TR port, the port's CRF RN, its associated BRF BN, the corresponding VLAN ID of the BRF, a CRF bridging mode (SRT or SRB) and a CRF-to-BRF spanning tree state (forwarding or blocking) are defined in local registers in the port interface circuitry (QS) of the port. The VLAN ID corresponding to the CRF RN may be obtained from the CRF table 1100.

According to the invention, the actual processing required for inbound frame parsing depends upon the type of frame being forwarded by the port; these frame types include Non-Source Route (NSR), All Routes Explorer (ARE), Spanning Tree Explorer (STE) and Specifically Routed Frame (SRF). For example, if the frame is an ARE, STE or SRF frame, the port interface circuitry located on each inbound port analyzes the RIF of the incoming frame prior to computing the source and destination address and VLAN information. If, on the other hand, the frame is an NSR frame, the computed address and VLAN information further depends upon the bridging type of the distributed bridge. Moreover if the RIF length is "2" for either an STE or ARE frame, the RIF is updated by increasing its length to "4" and appending the RN of the inbound, entry port (source CRF RN) plus 4 bits of zero after the old RIF.

Figure 13A:
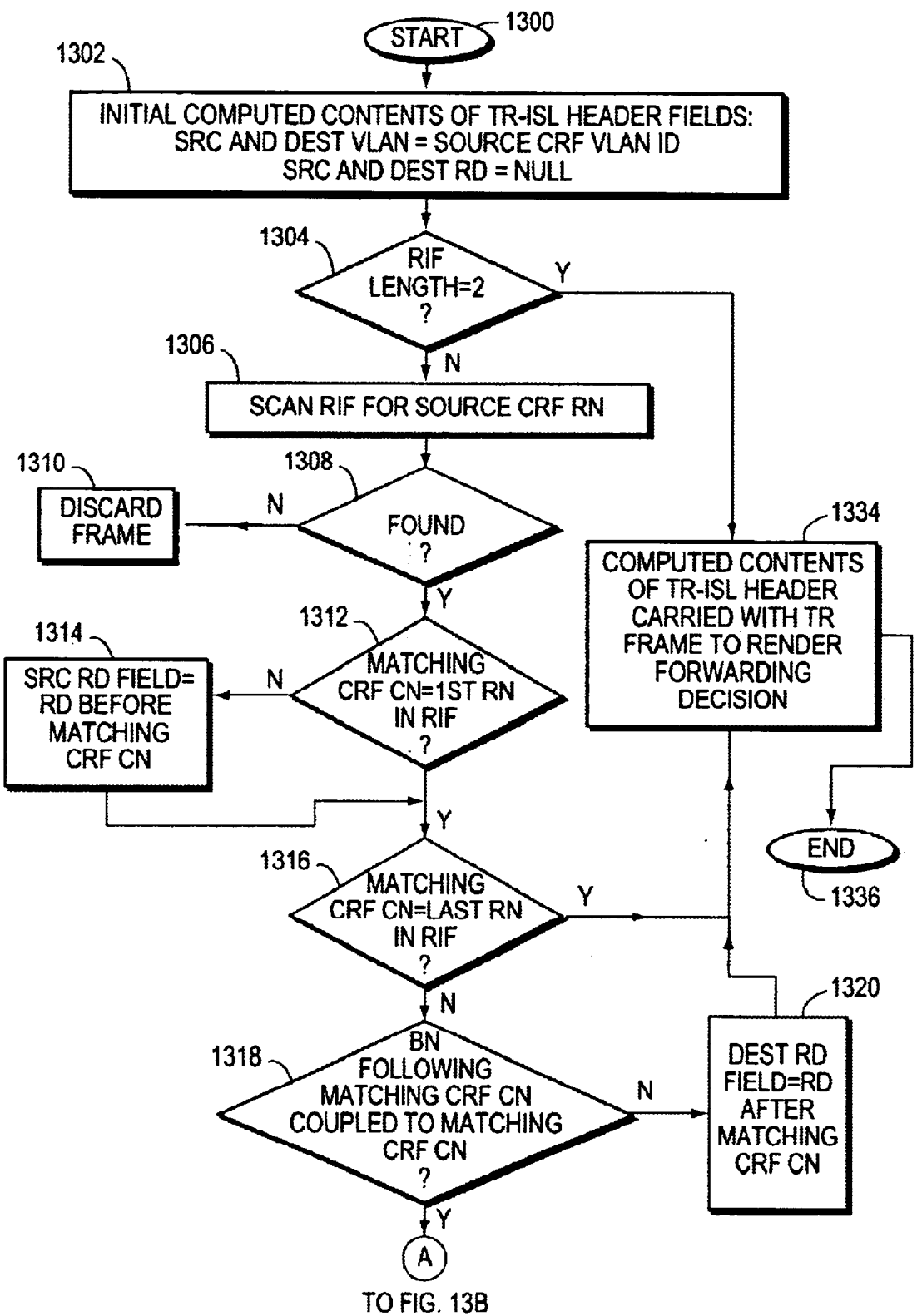
FIGS. 13A and 13B are flowcharts illustrating the sequence of steps for computing contents of the TR-ISL header with respect to an incoming frame at an inbound port of a switch in FIG. 8.
Figure 13B:
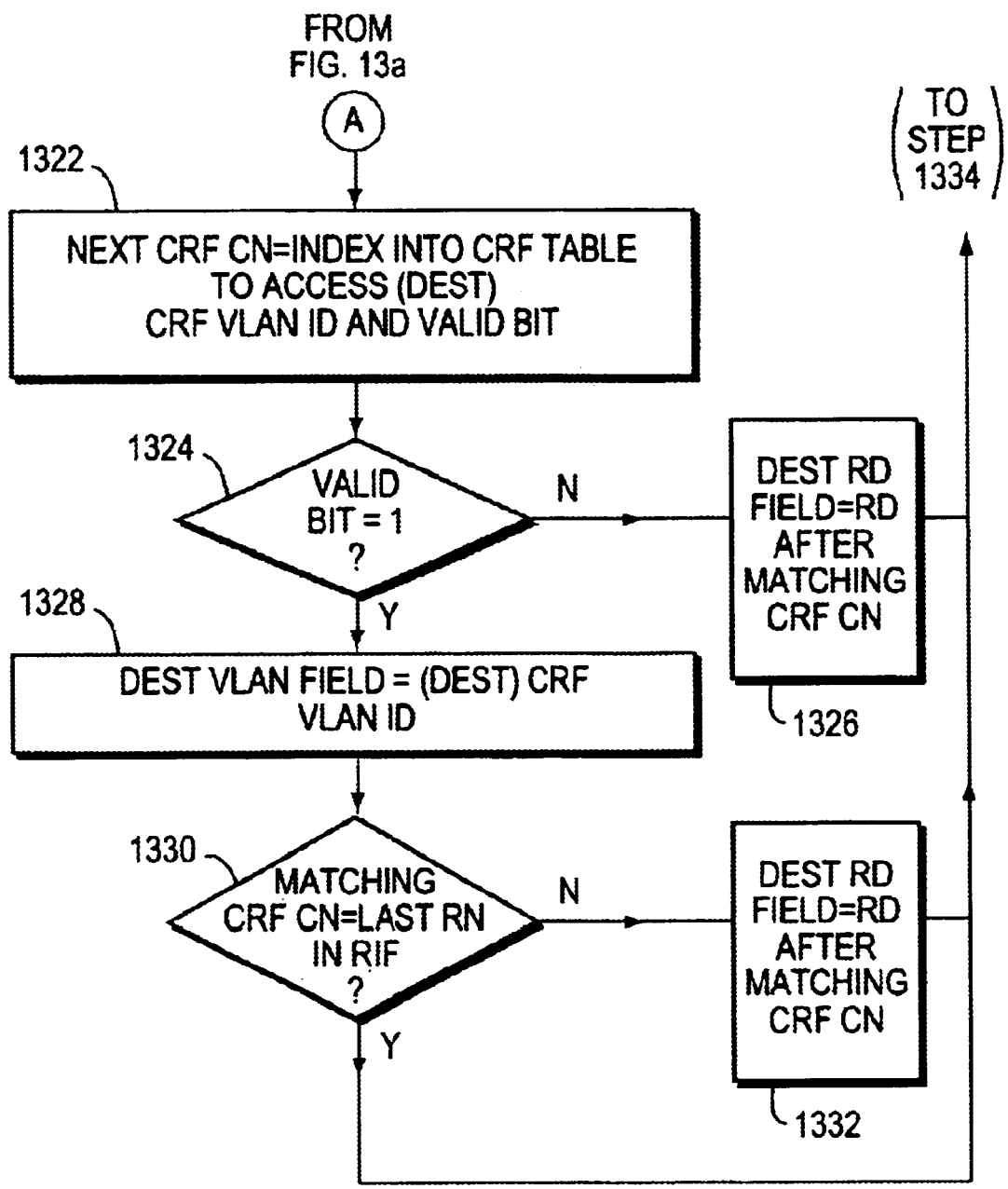

FIGS. 13A and 13B are flowcharts illustrating the sequence of steps for computing contents of certain TR-ISL header fields with respect to an incoming TR frame, e.g., a SRF frame, at an inbound port of the switch. The sequence starts at Step 1300 and proceeds to Step 1302 where, initially, the contents of the source and destination VLAN fields of the TR-ISL header are computed as the VLAN ID of the inbound port's (source) CRF, and the contents of the source and destination RD fields are computed as null (i.e., zero). In Step 1304, the RIF length field of the frame is examined and if its contents equal "2", the initial contents of the TR-ISL header fields (including the null RD fields) are carried with the incoming frame and used by the interface circuitry to access the appropriate table (e.g., the modified forwarding table 1100) when rendering a forwarding decision for the frame (Step 1334). The sequence then ends in Step 1336. If the RIF length is not equal to "2", routing information is contained in the RIF. In Step 1306, the RIF is scanned to determine if the source CRF RN is in the RIF. If the source CRF RN is not in the RIF (Step 1308), then the TR frame is discarded in Step 1310.

If the source CRF RN is found in the RIF, then in Step 1312 it is determined whether the source's "matching" CRF RN is the first RN in the RIF. If it is not, then in Step 1314 the inbound port circuitry loads the source RD field with the RD information located before the matching CRF RN to update the computed contents of the TR-ISL header field. If the matching CRF RN is the first RN in the RIF, in Step 1316 it is determined whether the matching CRF RN is the last RN of the RIF. If it is, the computed contents of the TR-ISL header fields are carried with the incoming frame and used by the interface circuitry to access the appropriate table (e.g., the modified forwarding table 1100) when rendering a forwarding decision for the frame (Step 1334). The sequence then ends in Step 1336.

If the matching CRF RN is not the last RN of the RIF, in Step 1318 it is determined whether the BN following the matching CRF RN is the BRF BN logically coupled to the matching CRF RN. If it is not, the inbound port circuitry loads the destination RD field with RD information located after the matching CRF RN (Step 1320) to thereby update the computed contents of the TR-ISL header field. The determination of whether the CRF RN is coupled to the distributed BRF is made by examining the table (i.e., CRF table) that maps CRFs to their respective BRF. In this case, the following BRF BN may be outside of the distributed bridge, so the SRF frame is prepared for possible external "bridging". The computed contents of the TR-ISL header fields are carried with the incoming frame and used by the interface circuitry to access the appropriate table (e.g., the modified forwarding table 1100) when rendering a forwarding decision for the frame (Step 1334). The sequence then ends in Step 1336.

If the following BRF BN is logically coupled to the matching CRF RN, the next (CRF) RN in the RIF is used as an index into the CRF table in Step 1322. Here, the (destination) CRF VLAN ID and valid bit are accessed from the table and, if the valid bit is not equal to "1" (Step 1324), then the inbound port circuitry loads the destination RD field with RD information located after the matching CRF RN (Step 1326) to update the computed contents of the TR-ISL header field. The computed contents of the TR-ISL header fields are then carried with the incoming frame and used by the interface circuitry to access the appropriate table (e.g., the modified forwarding table 1100) when rendering a forwarding decision for the frame (Step 1334) which may result in the SRF frame being "bridged" external to the distributed TR bridge. The sequence then ends in Step 1336.

As noted, the valid bit indicates whether the RN corresponds to a CRF associated with a particular BRF; in the illustrative embodiment described herein, an asserted state ("1") of the valid bit indicates that the CRF RN is associated (i.e., logically coupled) to the following BRF BN. If the valid bit is equal to "1", then the inbound port circuitry loads the destination VLAN field of the TR-ISL header with the contents of the (destination) CRF VLAN ID field of the CRF table (Step 1328) to update the computed contents of the TR-ISL header field.

Steps 1318 and 1322–1324 essentially involve scanning the RIF for a unique triplet that specifies traversal of the frame through the BRF. The unique triplet includes (i) the source CRF RN, (ii) the BRF BN and (iii) another CRF RN logically coupled to the BRF. Each portion/prong of the unique triplet must be "true" in order for that path to traverse through the BRF. If the RDs in the RIF do not match this unique triplet, then the path of the incoming frame does not pass through the BRF. If the unique triplet is found in the RIF, in Step 1330 it is determined whether the matching CRF RN is the last RN of the RIF. If it is not, the inbound port circuitry loads the destination RD field with RD information located after the matching CRF RN (Step 1332). Thereafter, in Step 1334, the computed contents of the TR-ISL header fields are carried with the incoming frame and used by the interface circuitry to access the appropriate table (e.g., the modified forwarding table 1100) when rendering a forwarding decision for the frame and the sequence ends in Step 1336.

Inbound Frame Forwarding

Figure 14A:
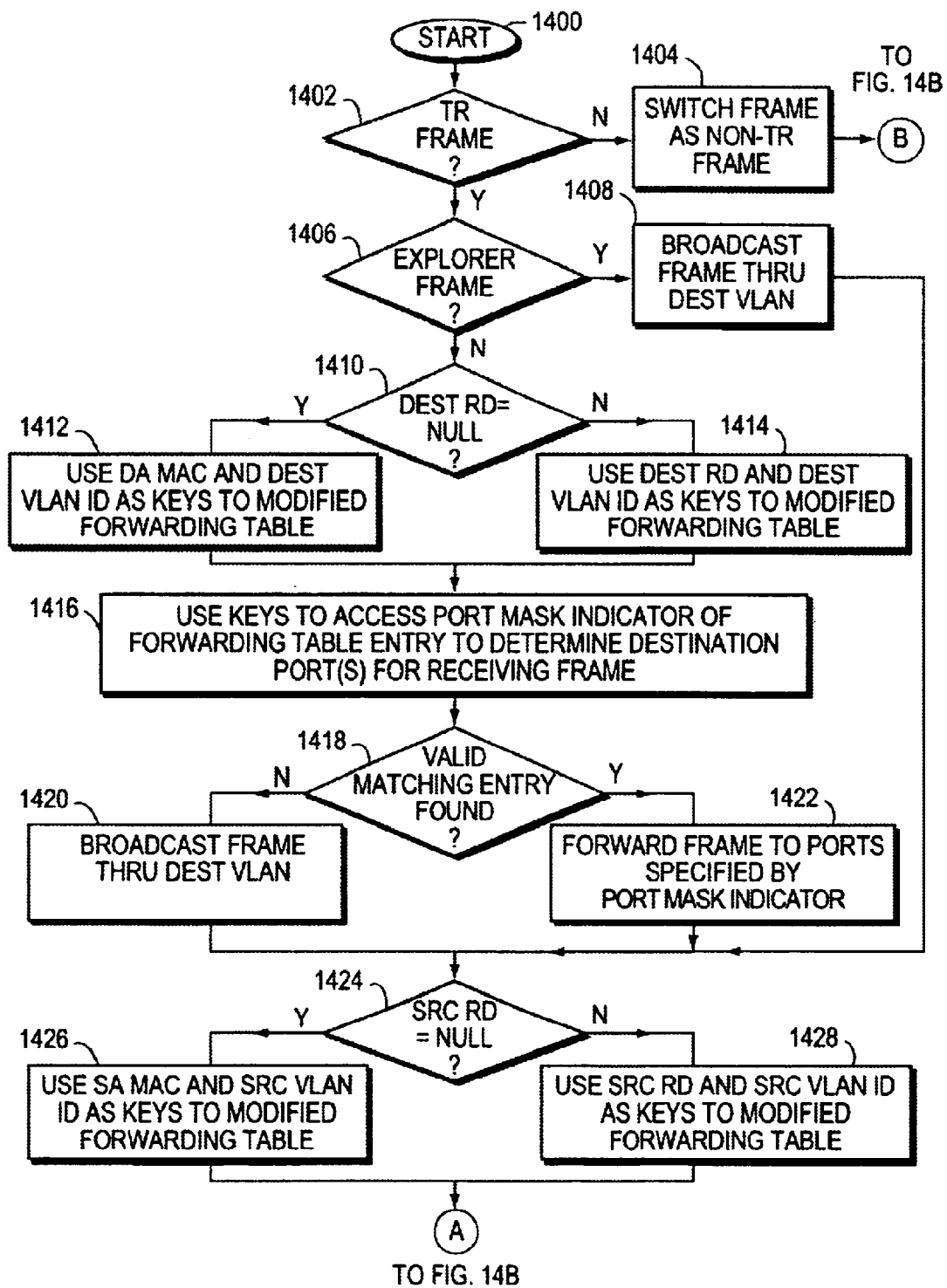
FIGS. 14A and 14B are flowcharts illustrating the sequence of steps for rendering a forwarding decision using the computed contents of the TR-ISL header with respect to an incoming TR frame at an inbound port of the switch.
Figure 14B:
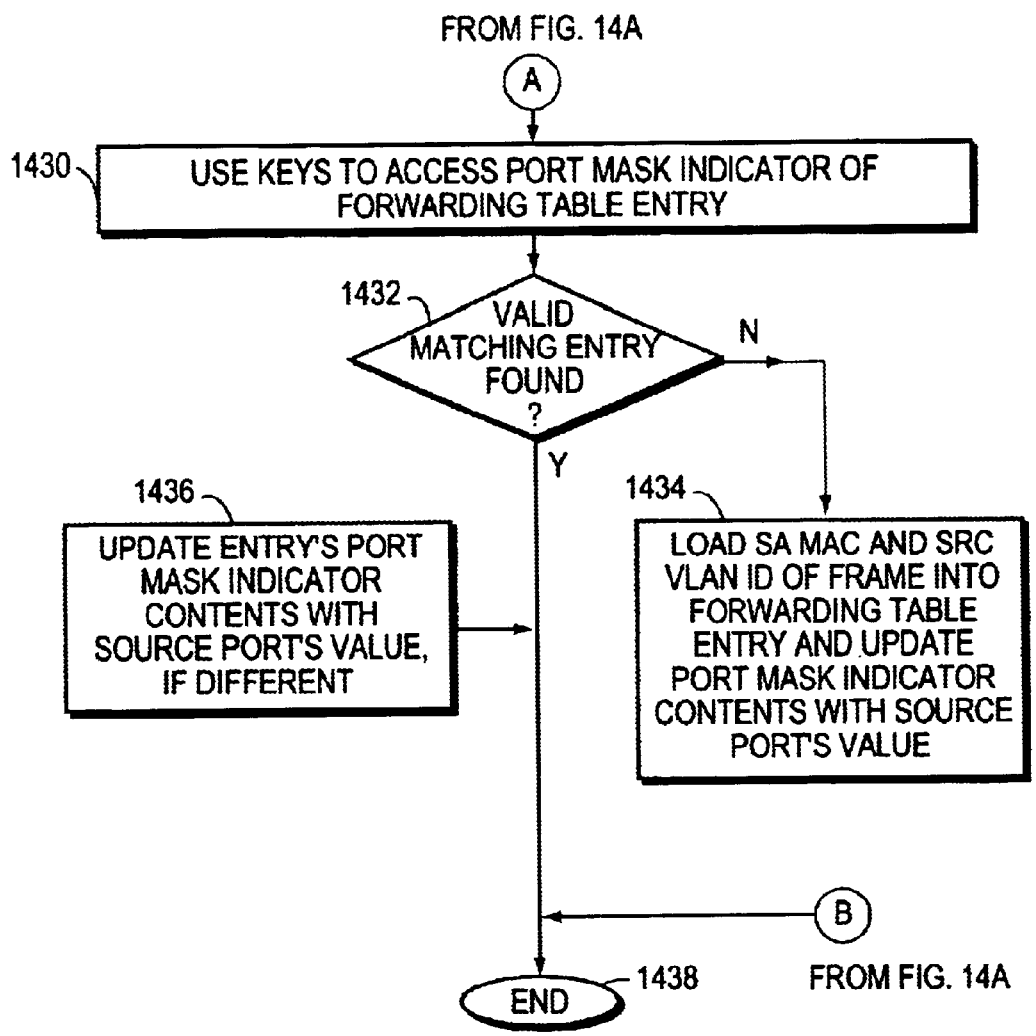

After parsing the frame to compute the contents of the destination and source VLAN fields and the source and destination RD fields of the TR-ISL header, the interface circuitry of an inbound port performs the following forwarding decision and learning operations. FIGS. 14A and 14B are flowcharts illustrating the sequence of steps for rendering a forwarding decision using the computed contents of the TR-ISL header fields with respect to an incoming TR frame at an inbound port of the switch.

Forwarding Decision

The sequence starts at Step 1400 and proceeds to Step 1402 where the circuitry determines whether the frame is a TR frame by examining the contents of the TYPE field 1214 of the TR-ISL frame. If it is not, the frame is "switched" as a non-TR frame, such as an Ethernet frame, in Step 1404. If the frame is a TR frame, in Step 1406 it is determined whether the frame is an explorer (ARE or STE) frame. If the frame is an explorer frame, then in Step 1408 the TR frame is broadcast throughout the specified destination VLAN (i.e., all ports in the BRF or the entry port's CRF).

If the TR frame is not an explorer frame, in Step 1410 it is determined whether the contents of the destination RD are null. If so, the destination MAC address and destination VLAN contents are used as keys for accessing the modified forwarding table 1100 (Step 1412). However, if the contents of the destination RD are not null, in Step 1414 the destination RD and destination VLAN contents (along with a prepended constant) are used as keys to access the table. In either case, the keys are used to index into the modified forwarding table in Step 1416 to access an appropriate entry and "look-up" (examine) the port mask indicator of field 1114 to determine the destination port(s) for receiving the frame. In Step 1418, it is determined whether a valid matching entry is found. If not, the frame is broadcast throughout the specified destination VLAN (Step 1420). If a valid matching entry is found, the TR frame is forwarded to the ports specified by the port mask indicator in Step 1422, except the port or trunk on which the frame was received.

Source Leaning

In Step 1424, it is determined whether the contents of the source RD are null. If so, the source MAC address and source VLAN contents are used as keys for accessing the modified forwarding table 1100 (Step 1426). However, if the contents of the source RD are not null, in Step 1428 the source RD and source VLAN contents (along with a prepended constant) are used as keys to access the table. In either case, the keys are used to index into the modified forwarding table in Step 1430 to access an appropriate entry and "look-up" (examine) the port mask indicator of field 1114 to determine its contents. Specifically, in Step 1432, it is determined whether a valid matching entry is found. If a valid matching entry is found, the entry's port mask indicator contents are updated with this source port's value, if different (Step 1436); the sequence ends at Step 1438. Otherwise, the source MAC address is loaded into the address field 1112 of the appropriate entry 1102, while the source VLAN is loaded into the VLAN ID field 1110 of the entry (Step 1434) and the source port's value is written into the port mask indicator field 1114. The sequence then ends at Step 1438.

Outbound Frame Processing

When the frame is copied to an outbound trunk port specified by the port mask indicator, the ISL circuitry encapsulates the frame with the enhanced ISL header, including the TR-ISL header according to the present invention. In the illustrative embodiment, the trunk encapsulation (ENCAP) circuit 964 generally constructs the TR-ISL encapsulated frame by appending, inter alia, the source and destination VLAN fields, as well as the source and destination RD fields to the TR frame, and loads those fields with appropriate information carried with the frame prior to transmitting the encapsulated frame over the trunk. Broadly stated, the collective ISL circuitry (i) adds the ISL DA 1212, ISL SA 1216 and LEN 1218; (ii) sets the contents of the TYPE field 1214 to indicate a native TR frame and sets the F bit 1260 to indicate whether the TR CRC is present in the NATIVE FRAME 1220; (iii) adds the PAD 1270 and sets the E SIZE 1262 to indicate the number of bytes in the NATIVE FRAME 1220 if the entire ISL packet (fields 1212 through 1215) is less than 64 bytes without the PAD 1270; (iv) appends a computed INT FCS 1272 covering the contents of fields SRC VLAN 1254 through PAD 1270; and (v) append a computed ISL CRC 1215 covering the entire ISL packet 1200. Upon receiving the encapsulated frame, the trunk decapsulation (DECAP) circuit 966 of the ISL circuitry parses the carried information according to the inbound frame processing sequence described above.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for efficiently transporting token ring (TR) frames through a token ring computer network, comprising:
   interconnecting a first switch and a second switch with an interswitch link (ISL) link;
   receiving an incoming TR frame at an inbound port of the first switch, the inbound port associated with a source Concentrator Relay Function (CRF);
   parsing the incoming TR frame at the inbound port to obtain forwarding information;
   rendering a forwarding decision for the incoming TR frame using the forwarding information from the incoming TR frame; and
   encapsulating the incoming TR frame with the forwarding information when the rendered forwarding decision indicates transporting of the TR frame from the first switch to the second switch over the ISL link, a logical token ring extending from the CRF through the ISL link.

2. The method of claim 1 wherein the step of encapsulating comprises the steps of:
   appending a TR-ISL header to the incoming TR frame, the appended TR-ISL header including a source virtual local area network (VLAN) field; and
   loading the source VLAN field with the computed information pertaining to the source VLAN identifier (ID).

3. The method of claim 1 further comprising:
   parsing the incoming TR frame at the inbound port to compute source and destination virtual local area network (VLAN) identifiers (IDs).

4. The method of claim 1 further comprising:
   parsing the incoming TR frame at the inbound port to compute source and destination route descriptors (RDs).

5. A method for efficiently transporting token ring (TR) frames through a token ring computer network, comprising:
   interconnecting a first switch and a second switch with an interswitch link (ISL) link;
   receiving an incoming TR frame at an inbound port of the first switch, the inbound port associated with a source Concentrator Relay Function (CRF);
   parsing the incoming TR frame at the inbound port to compute forwarding information;
   rendering a forwarding decision for the incoming TR frame using the computed forwarding information from the incoming TR frame;
   encapsulating the incoming TR frame with the computed forwarding information when the rendered forwarding decision indicates transporting of the TR frame from the first switch to the second switch over the ISL link;
   appending a TR-ISL header to the incoming TR frame, the TR-ISL header including source and destination virtual local area network (VLAN) fields along with source and destination route descriptor (RD) fields;
   loading the source and destination VLAN fields with the computed forwarding information pertaining to a source and destination VLAN identifiers (IDs); and
   loading the source and destination RD fields with the computed forwarding information pertaining to the source and destination RDs.

6. The method of claim 5 further comprising:
   parsing the incoming TR frame at the inbound port to compute source and destination VLAN IDs.

7. The method of claim 5 further comprising:
   parsing the incoming TR frame at the inbound port to compute source and destination RDs.

8. A method for efficiently transporting token ring (TR) frames through a token ring computer network, comprising:
   interconnecting a first switch and a second switch with an interswitch link (ISL) link;
   receiving an incoming TR frame at an inbound port of the first switch, the inbound port associated with a source Concentrator Relay Function (CRF); parsing the incoming TR frame at the inbound port to compute forwarding information;
   rendering a forwarding decision for the incoming TR frame using the computed forwarding information from the incoming TR frame;
   encapsulating the incoming TR frame with the computed forwarding information when the rendered forwarding decision indicates transporting of the TR frame from the first switch to the second switch over the ISL link;
   appending a TR-ISL header to the incoming TR frame, the TR-ISL header including source and destination virtual local area network (VLAN) fields along with source and destination route descriptor (RD) fields;
   appending an E size field of the TR-ISL header, the E size field specifying an extent of padding for the encapsulated TR frame;
   appending an F field of the TR-ISL header, the F field containing an FCS not present indicator;
   loading the source and destination VLAN fields with the computed forwarding information pertaining to the source and destination VLAN identifiers (IDs); and loading the source and destination RD fields with the computed forwarding information pertaining to the source and destination RD fields.

9. The method of claim 8 wherein each TR frame has a routing information field (RIF) including a RIF length field and a route field, and wherein the step of parsing the incoming TR frame comprises the steps of:

examining contents of the RIF length field of the incoming TR frame at port interface circuitry of the inbound port; and if the contents of the RIF length field indicate there is no routing information contained in the route field of the RIF, computing information contents of (i) the source and destination VLAN fields as the VLAN ID of the source CRF and (ii) the source and destination RD fields as null.

10. The method of claim 9 wherein each CRF has a ring number (RN) and each BRF has a bridge number (BN), and wherein the step of parsing further comprises the steps of:

if the contents of the RIF length field indicate there is routing information contained in the route field of the RIF, scanning the RIF to determine if the source CRF RN is contained (matched) in the RIF; and if the source CRF RN is not matched in the RIF, discarding the incoming TR frame.

11. The method of claim 10 wherein the step of parsing further comprises the steps of:

if the source CRF RN is matched in the RIF, determining whether the matching CRF RN is the first RN in the RIF; and if the matching CRF RN is not the first RN in the RIF, loads the source RD field with RD information located before the matching CRF RN to thereby update the computed information.

12. The method of claim 11 wherein the step of parsing further comprises the steps of:

if the matching CRF RN is the first RN in the RIF, determining whether the matching CRF RN is the last RN of the RIF; and if the matching CRF RN is the last RN of the RIF, using the updated computed information to render the forwarding decision for the incoming TR frame.

13. The method of claim 12 wherein the step of parsing further comprises the steps of:

if the matching CRF RN is not the last RN of the RIF, determining whether a BN following the matching CRF RN is a BRF BN logically coupled to the matching CRF RN; and if the following BRF BN is not logically coupled to the matching CRF RN, loading the destination RD field with RD information located after the matching CRF RN to thereby update the computed information.

14. The method of claim 13 wherein the step of parsing further comprises the steps of:

if the following BRF BN is logically coupled to the matching CRF RN, using a next CRF RN in the RIF as an index into a CRF table to access an entry having a CRF VLAN ID field and a valid bit; and if the valid bit is not asserted, loading the destination RD field with RD information located after the matching CRF RN to thereby update the computed information.

15. The method of claim 14 wherein the step of parsing further comprises the steps of:

if the valid bit is asserted, loading the destination VLAN field with contents of the CRF VLAN ID field;

determining whether the matching CRF RN is the last RN of the RIF;

if the matching CRF RN is not the last RN of the RIF, loading the destination RD field with RD information located after the matching CRF RN to thereby update the computed information.

16. The method of claim 8 wherein the step of rendering a forwarding decision comprises the step of accessing a modified forwarding table of the first switch.

17. A system for efficiently transporting token ring (TR) frames between switches of a distributed TR bridge having a distributed switch fabric, each switch including a Bridge Relay Function (BRF) coupled to a plurality of Concentrator Relay Functions (CRFs) having a plurality of ports for receiving TR frames over TR segments, each CRF and BRF assigned a virtual local area network (VLAN) identifier (ID), the system comprising:

an interswitch link (ISL) trunk interconnecting the switches of the TR bridge;

interface circuitry contained within each switch for coupling to the ISL trunk, the interface circuitry encapsulating a TR frame within a TR-ISL header having a source VLAN ID associated with a source CRF of the TR frame, the interface circuitry transmitting the TR-ISL encapsulated frame over the ISL trunk.

18. The system of claim 17 wherein the TR-ISL header comprises source and destination VLAN fields along with source and destination route descriptor (RD) fields.

19. A system for efficiently transporting token ring (TR) frames between switches of a distributed TR bridge having a distributed switch fabric, each switch including a Bridge Relay Function (BRF) coupled to a plurality of Concentrator Relay Functions (CRFs) having a plurality of ports for receiving TR frames over TR segments, each CRF and BRF assigned a virtual local area network (VLAN) identifier (ID), the system comprising:

an interswitch link (ISL) trunk interconnecting the switches of the TR bridge;

interface circuitry contained within each switch for coupling to the ISL trunk, the interface circuitry encapsulating a TR frame within a TR-ISL header having a source VLAN ID associated with a source CRF of the TR frame, the interface circuitry transmitting the TR-ISL encapsulated frame over the ISL trunk;

wherein the TR-ISL header comprises source and destination VLAN fields along with source and destination route descriptor (RD) fields; and wherein the TR-ISL header further comprises an E size field with contents that specify an extent of padding for the encapsulated TR frame and an F field containing a frame check sequence (FCS) not present indicator.

20. A method for use in a switch comprising the steps of:

receiving an incoming token ring (TR) frame at an inbound port of the switch, the inbound port associated with a source Concentrator Relay Function (CRF);

parsing the incoming TR frame to compute forwarding information;

rendering a forwarding decision for the incoming TR frame using the computed forwarding information from the incoming TR frame; and encapsulating the incoming TR frame with the computed forwarding information when the rendered forwarding decision indicates transporting of the TR frame from the switch over an interswitch link (ISL).

21. The method of claim 20 further comprising:
parsing the incoming TR frame at the inbound port to compute source and destination virtual local area network (VLAN) identifiers (IDs).

22. The method of claim 20 further comprising:
parsing the incoming TR frame at the inbound port to compute source and destination route descriptors (RDs).

23. A switch, comprising:
means for receiving an incoming token ring (TR) frame at an inbound port of the switch, the inbound port associated with a source Concentrator Relay Function (CRF);
means for parsing the incoming TR frame to compute information;
means for rendering a forwarding decision for the incoming TR frame using the computed forwarding information from the incoming TR frame; and
means for encapsulating the incoming TR frame with the computed forwarding information when the rendered forwarding decision indicates transporting of the TR frame from the switch over an interswitch link (ISL).

24. Switch according to claim 23 further comprising:
the inbound port to computing source and destination virtual local area network (VLAN) identifiers (IDs).

25. Switch according to claim 23 further comprising:
the inbound port to computing source and destination route descriptors (RDs).

26. A switch, comprising:
an inbound port to receive an incoming token ring (TR) frame, the inbound port associated with a source Concentrator Relay Function (CRF);
an outbound port to send an outgoing TR frame over an interswitch link (ISL);
circuitry to parse the incoming TR frame to compute forwarding information;
circuitry to render a forwarding decision for the incoming TR frame using the computed forwarding information from the incoming TR frame; and
circuitry to encapsulate the incoming TR frame with the computed forwarding information when the rendered forwarding decision indicates transporting of the TR frame from the outbound port over the ISL.

27. Switch according to claim 26 further comprising:
the inbound port to computing source and destination virtual local area network (VLAN) identifiers (IDs).

28. Switch according to claim 26 further comprising:
the inbound port to computing source and destination route descriptors (RDs).

29. A method to operate a computer network comprising:
coupling a Bridge Relay Function (BRF) of a first switch to a plurality of Concentrator Relay Functions (CRFs) having a plurality of ports for receiving and transmitting TR frames over TR segments;
coupling a BRF of a second switch to a plurality of CRFs having a plurality of ports for receiving and transmitting TR frames over TR segments;
interconnecting the first and second switches with an interswitch link (ISL) link;
receiving an incoming TR frame at an inbound port of the first switch, the inbound port associated with a source CRF;
parsing the incoming TR frame at the inbound port to obtain forwarding information;
rendering a forwarding decision for the incoming TR frame using the forwarding information from the incoming TR frame;
encapsulating the incoming TR frame with the forwarding information to form an encapsulated frame when the rendered forwarding decision indicates transporting of the TR frame from the first switch to the second switch over the ISL link; and
transmitting the encapsulated frame from the first switch over the ISL link to the second switch.

30. The method of claim 29 further comprising:
parsing the incoming TR frame at the inbound port to compute source and destination virtual local area network (VLAN) identifiers (IDs).

31. The method of claim 29 further comprising:
parsing the incoming TR frame at the inbound port to compute source and destination route descriptors (RDs).

32. The method of claim 29 further comprising:
running a logical token ring through the first switch, the second switch and the ISL link.

33. Apparatus for efficiently transporting token ring (TR) frames through a token ring computer network, comprising:
a first switch including a Bridge Relay Function (BRF) coupled to a plurality of Concentrator Relay Functions (CRFs) having a plurality of ports for receiving and transmitting TR frames over TR segments;
a second switch including a BRF coupled to a plurality of CRFs having a plurality of ports for receiving and transmitting TR frames over TR segments;
an interswitch link (ISL) interconnecting the first and second switches;
an inbound port of the first switch receiving a TR frame, the inbound port associated with a source CRF;
the inbound port parsing an incoming TR frame to obtain forwarding information;
a first circuitry to render a forwarding decision for the incoming TR frame using the forwarding information;
a second circuitry to encapsulate an incoming TR frame with the forwarding information when the rendered forwarding decision indicates transporting of the TR frame from the first switch to the second switch over the ISL link; and
an outbound port to transmit the encapsulated frame from the first switch over the ISL link to the second switch.

34. Apparatus according to claim 33 further comprising:
the inbound port computing source and destination virtual local area network (VLAN) identifiers (IDs).

35. Apparatus according to claim 33 further comprising:
the inbound port computing source and destination route descriptors (RDs).

36. Apparatus according to claim 33 further comprising:
the first switch, second switch and the ISL link implementing a logical token ring through the first switch, the second switch and the ISL link.

37. Apparatus for efficiently transporting token ring (TR) frames through a token ring computer network, comprising:
a first switch including a Bridge Relay Function (BRF) coupled to a plurality of Concentrator Relay Functions (CRFs) having a plurality of ports for receiving TR frames over TR segments
a second switch including a BRF coupled to a plurality of CRFs having a plurality of ports for receiving TR frames over TR segments;

an interswitch link (ISL) link interconnecting the first and second switches;

means for receiving an incoming TR frame at an inbound port of the first switch, the inbound port associated with a source CRF;

means for parsing the incoming TR frame at the inbound port to obtain forwarding information;

means for rendering a forwarding decision for the incoming TR frame using the forwarding information from the incoming TR frame;

means for encapsulating the incoming TR frame with the forwarding information when the rendered forwarding decision indicates transporting of the TR frame from the first switch to the second switch over the ISL link; and means for transmitting the encapsulated frame from the first switch over the ISL link to the second switch.

38. Apparatus according to claim 37 further comprising:

the inbound port computing source and destination virtual local area network (VLAN) identifiers (IDs).

39. Apparatus according to claim 37 further comprising:

the inbound port computing source and destination route descriptors (RDs).

40. Apparatus according to claim 37 further comprising:

the first switch, second switch and the ISL link implementing a logical token ring through the first switch, the second switch and the ISL link.

41. A method for operating a switch, comprising:

receiving a token ring frame (TR frame) at a port of the switch, the port coupled to a concentrator relay function (CRF) within the switch;

parsing the incoming TR frame to obtain forwarding information;

rendering a forwarding decision for the TR frame in response to the forwarding information;

encapsulating the TR frame with the forwarding information when the rendered forwarding decision indicates transporting the TR frame over an Interswitch link (ISL link) to a distant switch; and transmitting the encapsulated frame over the ISL link to establish a logical token ring network from the CRF through the ISL link to the distant switch.

42. The method of claim 41 further comprising:

coupling a Bridge Relay Function (BRF) to a plurality of CRFs having a plurality of ports for receiving TR frames over token ring (TR) segments.

43. A computer readable media, comprising: said computer readable media containing instructions for execution in a processor for the practice of the method of claim 1, or claim 5, or claim 8 or claim 20 or claim 29 or claim 41.

44. Electromagnetic signals propagating on a computer network, comprising: said electromagnetic signals carrying instructions for execution on a processor for the practice of the method of claim 1, or claim 5, or claim 8 or claim 20 or claim 29, or claim 44.

45. A switch, comprising:

means for receiving a token ring frame (TR frame) at a port of the switch, the port coupled to a concentrator relay function (CRF) within the switch;

means for parsing the incoming TR frame to obtain forwarding information;

means for rendering a forwarding decision for the TR frame in response to the forwarding information;

means for encapsulating the TR frame with the forwarding information when the rendered forwarding decision indicates transporting the TR frame over an Interswitch link (ISL link) to a distant switch; and means for transmitting the encapsulated frame over the ISL link to establish a logical token ring network from the CRF through the ISL link to the distant switch.

46. A switch according to claim 45 further comprising:

means for coupling a Bridge Relay Function (BRF) to a plurality of Concentrator Relay Functions (CRFs) having a plurality of ports for receiving TR frames over TR segments.

47. A switch, comprising:

a first port to receive a token ring frame (TR frame), the port connected to a concentrator relay function (CRF) within the switch;

a parser to parse the TR frame to obtain forwarding information;

a circuit to render a forwarding decision, and in the event that the forwarding decision indicates transporting the TR frame over an Interswitch link (ISL link) to a distant switch, encapsulating the TR frame with the forwarding information; and a second port coupled to the ISL link to transmit the encapsulated frame over the ISL link to establish a logical token ring network from the CRF through the ISL link to the distant switch.

48. A switch according to claim 47 further comprising:

a Bridge Relay Function (BRF) coupled to a plurality of CRFs having a plurality of ports for receiving TR frames over TR segments.

* * * * *